US011066242B2

(12) United States Patent
Pilarz et al.

(10) Patent No.: US 11,066,242 B2
(45) Date of Patent: Jul. 20, 2021

(54) POSITIVE DISPLACEMENT SORTER WITH PARALLEL DIVERT AND DIAGONAL DISCHARGE

(71) Applicant: Dematic Corp., Grand Rapids, MI (US)

(72) Inventors: Nolan R. Pilarz, Ada, MI (US); Veronique Cole, Greenville, MI (US); Shreedhar Murthy Hebbur, Kentwood, MI (US); Jeffery D. Duncan, Grand Rapids, MI (US); Nicholas M. Thomas, Cedar Springs, MI (US); Steven M. DeMan, Rockford, MI (US); John M. Karas, Grand Rapids, MI (US); Jeffrey S. DeVries, Grand Rapids, MI (US); Jeffery T. Boorsma, Grand Rapids, MI (US); Thomas H. Triesenberg, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 160 days.

(21) Appl. No.: 16/662,144

(22) Filed: Oct. 24, 2019

(65) Prior Publication Data

US 2020/0130938 A1    Apr. 30, 2020

Related U.S. Application Data

(60) Provisional application No. 62/749,707, filed on Oct. 24, 2018, provisional application No. 62/749,825, filed on Oct. 24, 2018.

(51) Int. Cl.
*B65G 13/10* (2006.01)
*B65G 13/07* (2006.01)
(Continued)

(52) U.S. Cl.
CPC ............ *B65G 13/10* (2013.01); *B65G 13/07* (2013.01); *B65G 13/071* (2013.01); *B65G 13/08* (2013.01);
(Continued)

(58) Field of Classification Search
CPC ...... B65G 13/07; B65G 13/071; B65G 13/08; B65G 13/10; B65G 47/54; B65G 47/844; B65G 2207/36
See application file for complete search history.

(56) References Cited

U.S. PATENT DOCUMENTS

| 1,975,927 A | 10/1934 | Cushman |
| 2,129,510 A | 9/1938 | Taylor |

(Continued)

FOREIGN PATENT DOCUMENTS

| FR | 1215029 A | 4/1960 |
| NL | 88303239 A | 4/1985 |

(Continued)

OTHER PUBLICATIONS

International Search Report and Written Opinion of the International Searching Authority from corresponding Patent Cooperation Treaty (PCT) Application No. PCT/IB2019/059133, indicated completed on Dec. 18, 2019.

*Primary Examiner* — Gene O Crawford
*Assistant Examiner* — Keith R Campbell
(74) *Attorney, Agent, or Firm* — Gardner, Linn, Burkhart & Ondersma LLP

(57) ABSTRACT

A positive displacement sorter and method of diverting articles includes a conveying surface configured to convey articles in a longitudinal direction and at least one diagonal take-away lane, extending diagonally from the conveying surface to receive articles being diverted from said conveying surface. A plurality of pushers are configured to move (Continued)

together in a lateral direction in order to displace an item on the conveying surface to the diagonal take-away lane. A rotational system is configured to rotate a leading portion of a diverted article in the direction of the take-away lane. A belt drive system is provided for driving live roller conveyors about a curved section of a roller conveyor of the sorter. The drive belt is guided along a single conical drive plane that maintains the orientation of the drive belt relative to the single conical drive plane and limits twisting and stress in the drive belt.

21 Claims, 22 Drawing Sheets

(51) Int. Cl.
  *B65G 47/84* (2006.01)
  *B65G 13/071* (2006.01)
  *B65G 13/08* (2006.01)
(52) U.S. Cl.
  CPC ........ *B65G 47/844* (2013.01); *B65G 2207/36* (2013.01)

(56) References Cited

U.S. PATENT DOCUMENTS

| | | | |
|---|---|---|---|
| 4,091,916 A | 5/1978 | Warner | |
| 4,308,946 A * | 1/1982 | Ouellette | B65G 13/07 198/790 |
| 4,353,458 A | 10/1982 | Saur | |
| 4,620,628 A | 11/1986 | Greenlee | |
| 4,753,339 A | 6/1988 | Vogt et al. | |
| 5,165,515 A * | 11/1992 | Nitschke | B65G 47/844 198/349.95 |
| 5,209,342 A | 5/1993 | vom Stein | |
| 5,332,083 A | 7/1994 | Axmann | |
| 5,826,702 A | 10/1998 | Gibson et al. | |
| 5,839,570 A | 11/1998 | Vertogen et al. | |
| 5,927,465 A | 7/1999 | Shearer, Jr. | |
| 6,041,909 A | 3/2000 | Shearer, Jr. | |
| 6,390,286 B1 * | 5/2002 | Nguyen | B65G 13/07 198/781.03 |
| 6,513,642 B1 | 2/2003 | Shearer, Jr. et al. | |
| 6,651,808 B2 | 11/2003 | Nguyen et al. | |
| 6,814,216 B2 | 11/2004 | Veit et al. | |
| 7,004,311 B2 | 2/2006 | Fatato et al. | |
| 7,497,316 B2 * | 3/2009 | Hysell | B65G 47/844 198/370.02 |
| 8,418,839 B2 * | 4/2013 | Anderson | B65G 13/071 198/787 |
| 9,038,809 B2 * | 5/2015 | Wilkins | B65G 47/46 198/370.02 |
| 9,457,961 B2 | 10/2016 | Green, III | |
| 10,040,633 B2 * | 8/2018 | Moser | B65G 13/071 |
| 10,040,640 B2 | 8/2018 | Boyce et al. | |
| 10,226,795 B2 * | 3/2019 | Schroader | B65G 43/10 |
| 10,640,302 B2 | 5/2020 | German et al. | |
| 2004/0262130 A1 * | 12/2004 | Brown | B65G 13/04 198/781.05 |
| 2005/0082146 A1 | 4/2005 | Axmann | |
| 2011/0022221 A1 | 1/2011 | Fourney | |
| 2012/0006657 A1 | 1/2012 | Karas et al. | |
| 2014/0224622 A1 * | 8/2014 | German | B65G 47/22 198/790 |
| 2019/0031450 A1 * | 1/2019 | German | B65G 47/71 |

FOREIGN PATENT DOCUMENTS

| | | |
|---|---|---|
| WO | 20000001598 | 1/2000 |
| WO | 20000040485 | 7/2000 |
| WO | 2004069697 A2 | 8/2004 |
| WO | 2014123574 A1 | 8/2014 |

* cited by examiner

POSITIVE DISPLACEMENT SORTER WITH PARALLEL DIVERT AND DIAGONAL DISCHARGE

CROSS REFERENCE TO RELATED APPLICATION

The present application claims priority of U.S. provisional applications Ser. No. 62/749,825 filed Oct. 24, 2018 and Ser. No. 62/749,707 filed Oct. 24, 2018, which are hereby incorporated herein by reference in their entireties.

BACKGROUND OF THE INVENTION

The present invention is directed to an article sorter apparatus and method of diverting articles and, in particular, to a positive displacement sorter and method that is capable of diverting at least some articles with more than one pusher shoe travelling together across a conveying surface to divert an article. Such diverting is known as parallel diverting. It should be understood that some parallel diverting sorters can also be capable of diverting articles with the pusher shoes extending diagonally across the conveying surface especially for long articles.

One difficulty with parallel sorters is that the orientation of the diverted articles in a longitudinal direction does not match that of the take-away lanes which are usually oriented at an angle, such as 20 degrees to 30 degrees from the direction of the sorter article conveying surface. This may cause article jams both between the sorter article conveying surface and the take-away lanes or further downstream in the conveyor lanes where they often make a turn in order to orient them in direction more perpendicular to the sorter article conveying surface. Conveyor systems may implement curves to direct the flow of items or packages, such as downstream of the take-away lane. Conveyors may be driven by various means, such as gears or belts.

SUMMARY OF THE INVENTION

The present invention is directed to a solution of the difficulties of the prior art including those referred to above. A positive displacement sorter and method of diverting articles, according to an aspect of the invention, includes a conveying surface configured to convey articles in a longitudinal direction and at least one diagonal take-away lane, extending diagonally from the conveying surface to receive articles being diverted from said conveying surface. A plurality of pushers are configured to move together in a lateral direction in order to displace an item on the conveying surface to the diagonal take-away lane. A rotational system is configured to rotate a leading portion of a diverted article in the direction of the take-away lane.

A positive displacement sorter and method of diverting articles, according to an aspect of the invention, includes a conveying surface configured to convey articles in a longitudinal direction and at least one diagonal take-away lane, extending diagonally from the conveying surface to receive articles being diverted from said conveying surface. A plurality of pushers are configured to move together in a lateral direction in order to displace an item on the conveying surface to the diagonal take-away lane. A rotational system is configured to rotate a diverted article in the direction of the take-away lane. The rotation system is a portion of the take-away lane.

The rotational system may be made up of another conveying surface having a first portion and a second portion, said first portion biasing articles toward said second portion, the second portion conveying articles in a directions of the take-away lane. The first portion may include a plurality of parallel rollers that are angled to convey in the directions toward the second portion. The rollers may be at an angle of between 10 degrees and 20 degrees with respect to the second portion. The second portion may have a surface with a higher friction than the first portion. The second portion may be a high-friction belt or a plurality of high-friction parallel rollers.

The first and second portions may have parallel rollers with the parallel rollers of the first portion being not co-axial with respect to the parallel rollers of the second portion. Separate drive belt assemblies may be configured to drive the parallel rollers of the first portion and the parallel rollers of the second portion. The first and second portions may have a same conveying speed.

A positive displacement sorter and method of diverting articles, according to an aspect of the invention, includes a conveying surface configured to convey articles in a longitudinal direction and at least one diagonal take-away lane, extending diagonally from the conveying surface to receive articles being diverted from said conveying surface. A plurality of pushers are configured to move together in a lateral direction in order to displace an item on the conveying surface to the diagonal take-away lane. A rotational system is configured to rotate a diverted article in the direction of the take-away lane, said rotation system comprising a leading one of said pushers configured to accelerate at a terminal portion of the displacement of the article.

A positive displacement sorter and method of diverting articles, according to an aspect of the invention, includes a conveying surface configured to convey articles in a longitudinal direction and at least one diagonal take-away lane, extending diagonally from the conveying surface to receive articles being diverted from said conveying surface. A plurality of pushers are configured to move together in a lateral direction in order to displace an item on the conveying surface to the diagonal take-away lane. A rotational system is configured to rotate a diverted article in the direction of the take-away lane. The rotation system includes at least one driven roller that is oriented in the longitudinal direction at an interface between the conveying surface and the diagonal take-away lane. The driven roller may be a plurality of co-axial driven rollers that are driven at greater rotational speeds in a longitudinal direction from upstream to downstream.

In one form of the present invention, a belt drive system for driving the rollers on a curve of a live roller conveyor is provided downstream of the take-away lane of the positive displacement sorter. The drive system drives a belt, such as a v-belt or a double v-belt, within a conical drive plane, maintaining the orientation of the belt relative to the conical drive plane. The conical drive plane of the belt reduces wear and fatigue on the belt caused during operation of the system, thus increasing the longevity and useful life of the belt. The drive system includes a series of support pressure assemblies with support pulleys, a series of guide pulleys, a motor driven pulley, line end guide pulleys, and at least one take-up pulley. The drive belt is routed through the drive system pulleys and is maintained within the conical drive plane of operation. The support pressure assemblies support the support pulleys which support the drive belt in contact with the rollers of the live roller conveyor, causing them to spin, thus driving the rollers.

A live roller conveyor having a curved path, according to an aspect of the invention, includes a belt drive system having a continuous drive belt routed through the drive system. The continuous drive belt is driven by a motor along a series of guide pulleys, around one line end pulley, through a series of support pressure assembly pulleys where it is held in contact with the conveyor rollers, around the opposite line end pulley, and then into a take-up pulley, around the motor driven pulley, around another take-up pulley and continuing back through the series of guide pulleys. As the drive belt is driven through the system it is maintained in the same orientation relative to the conical drive plane of operation. The orientation of the drive belt relative to the conical drive plane reduces stress and fatigue on the drive belt that would be experienced if the drive belt were twisted or bent to move through the system. When the drive belt contacts the conveyor rollers, friction between the belt and the roller cause the rollers to spin, the spinning rollers then impart friction on any items or packages supported by the rollers, thus driving the item or package along the conveyor.

The guide pulleys and the support pressure assembly pulleys are configured such that the guide pulleys route the drive belt below and out of contact with the conveyor rollers and the support pressure assembly pulleys route the drive belt in contact with the conveyor rollers. The guide pulleys are configured along one arc within the conical drive plane, the support pressure assembly pulleys are configured on another arc within the conical drive plane having a larger radius than the arc of the guide pulleys.

According to one form of the present invention, the support pressure assemblies include a support frame and a pulley system supported on the support frame. The support frame is mounted to the frame of the live roller conveyor on one end by mechanical fasteners. The mechanical fasteners may allow for vibration damping and minor movement of the support frame. The end of the support frame opposite the mechanical fasteners is supported against the frame of the live roller conveyor by a shock absorbing support. The shock absorbing support may be a spring, a rubber support, a calamari bumper, or the like. The support frame includes a space defined by a hole through the frame that allow a support for the guide pulleys to pass through the support frame such that the guide pulley is mounted to the conveyor frame independent of the support frame. In another aspect, the guide pulley is mounted to the support frame such that the guide pulley and the support pressure assembly pulleys remain in the same plane during operation of the belt drive system. In one aspect, the support pressure assemblies include a set of perpendicular roller bearings that create a cradle or guide along which the drive belt is supported. In another aspect the support pressure assemblies include a v-belt pulley to support and guide the belt.

Therefore, the present invention provides positive displacement sorter having a take-away lane and a rotation system to rotate a leading portion of an article in the direction of the take-away lane. The rotation system includes a first and a second portion of a conveying surface of the take-away lane. The first portion of the conveying surface are angled to convey the article toward the second portion of the conveying surface. The second portion is configured to convey the articles in the direction of the take-away lane. A curved path live roller conveyor having a belt drive system may be provided downstream of the take-away lane to convey the articles away from the take-away lane. The belt drive system is provided for driving the rollers on the curved live roller conveyor. The belt drive system maintains the drive belts in one conical drive plane of operation, allowing the belt to remain in the ideal orientation for driving the conveyor rollers while decreasing twisting or bending of the belt, which decreases stress on the tension members inside the belt and increases longevity and useful life of the belt.

These and other objects, advantages and features of this invention will become apparent upon review of the following specification in conjunction with the drawings.

DETAILED DESCRIPTION OF THE PREFERRED EMBODIMENT

Figure 1:
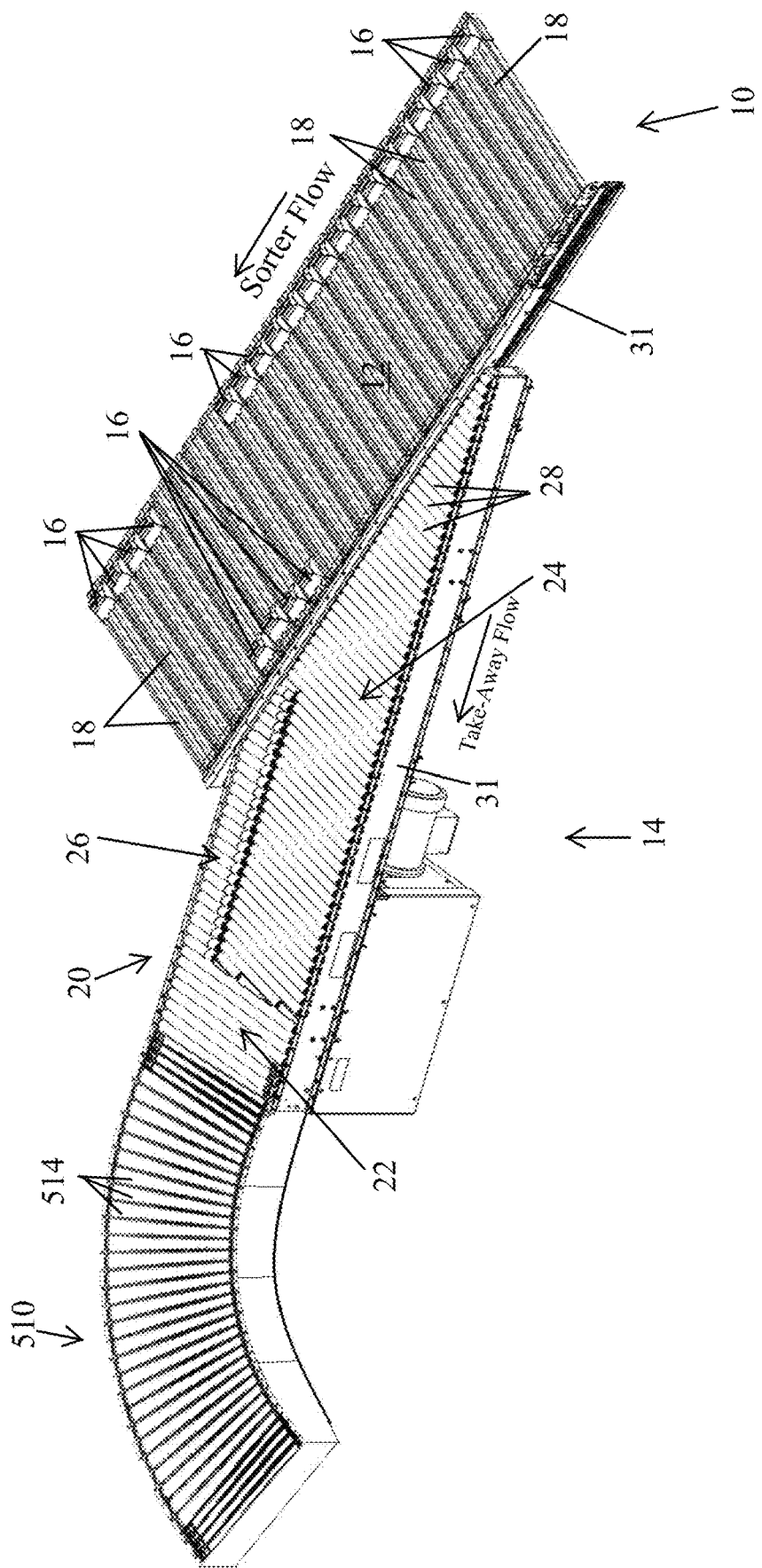
FIG. 1 is a perspective view of a positive displacement sorter according to an embodiment of the invention.

Referring now to the drawings and the illustrative embodiments depicted therein, a positive displacement sorter 10 includes a conveying surface 12 configured of interconnected slats 18 to convey articles in a longitudinal direction as illustrated by the sorter flow arrow and at least one diagonal take-away lane 14, extending diagonally from said conveying surface to receive articles being diverted from said conveying surface. (FIG. 1) Positive displacement sorter 10 is capable of diverting articles without rotating the articles and is thus a parallel diverter of the type disclosed in commonly assigned U.S. Pat. No. 6,814,216, the disclosure of which is hereby incorporated herein by reference. This is accomplished by a plurality of pushers 16 being configured to generally move together in a lateral direction in order to displace an item on conveying surface 12 to diagonal take-away lane 14.

A rotational system is configured to rotate a leading portion of a diverted article in the direction of take-away lane 14. Because the leading portion of the diverted article is rotated in the diverting direction with respect to the trailing portion, the gap between the diverted article and the trailing article is not substantially reduced and the diverted article is placed on take-away lane 14 sooner than prior art systems in which the trailing portion of the diverted article is retarded with respect to movement of the leading portion of the article. Thus, the positive displacement sorter is operated more efficiently.

Figure 2:
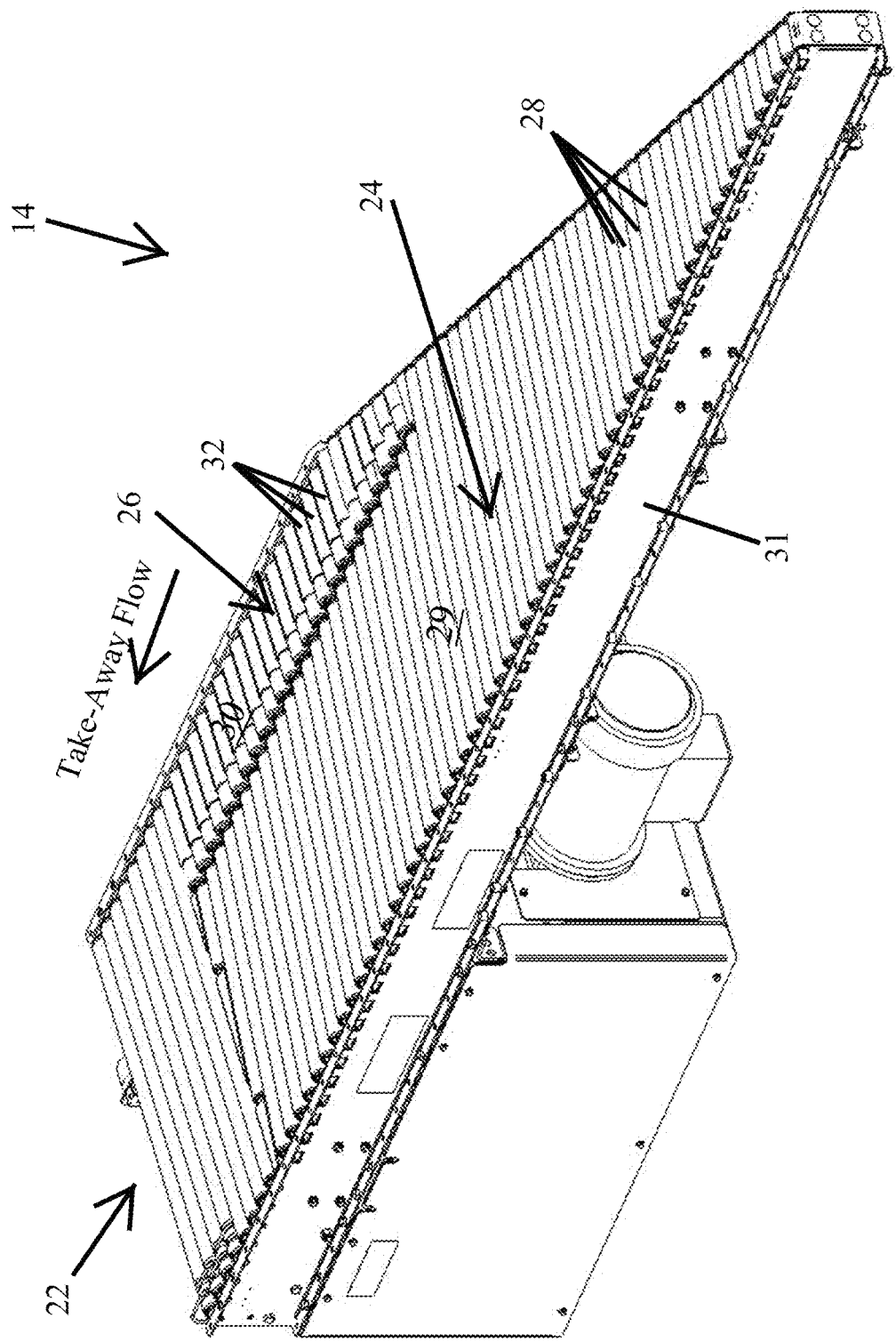
FIG. 2 is a perspective view of the take-away lane of the sorter in FIG. 1.
Figure 3:
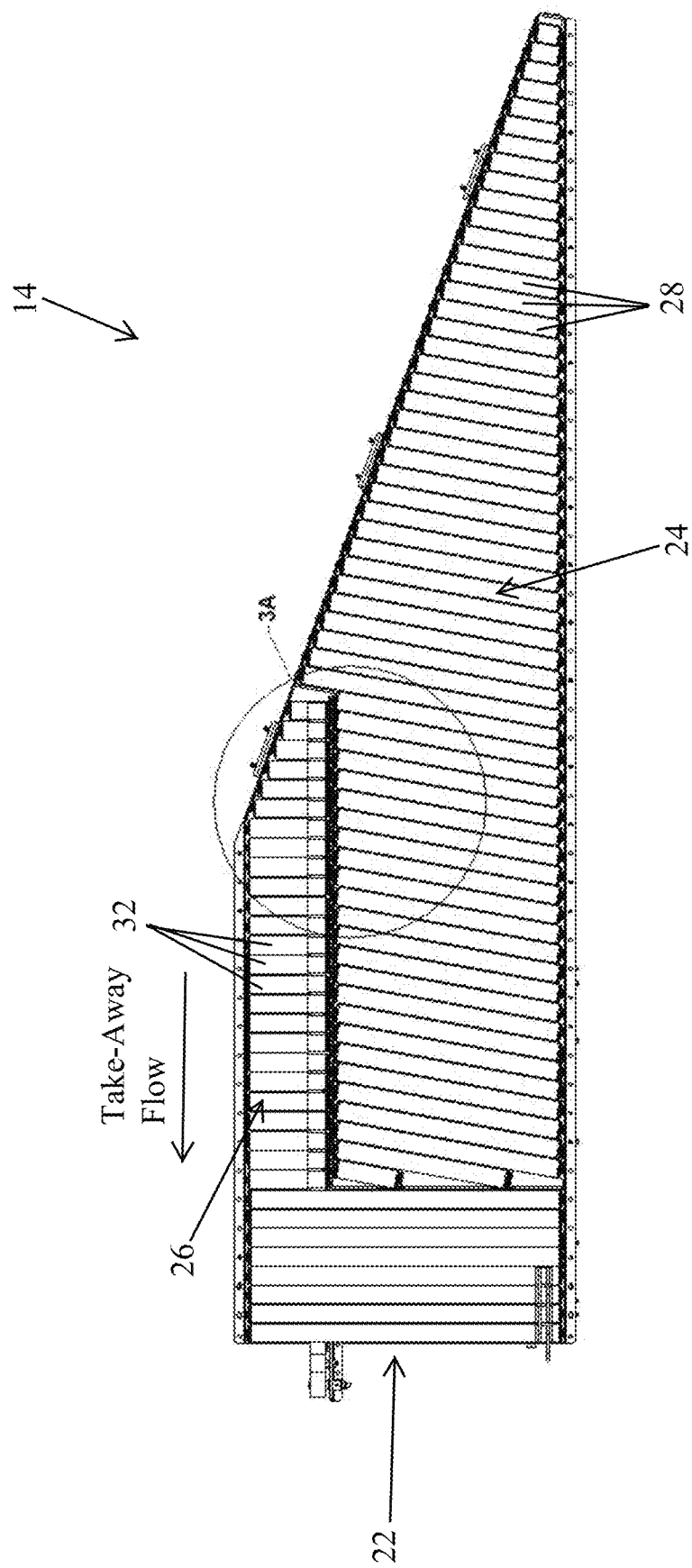
FIG. 3 is a top plan view of the take-away lane in FIG. 2.

In positive displacement sorter 10, a rotation system 20 is a portion of take-away lane 14. Rotational system 20 is made up of a conveying surface 22 having a first portion 24 and a second portion 26. (FIGS. 1-3). First portion 24 biases articles toward second portion 26 and second portion 26 conveys articles in a direction of take-away lane 14. First portion 24 is made up of a plurality of parallel rollers 28 that are angled toward second portion 26 in order to convey articles in the direction toward the second portion 26. In the illustrated embodiment, rollers 28 are set at an angle of between ten (10) degrees and twenty (20) degrees with respect to second portion 26. (FIG. 3).

Figure 3A:
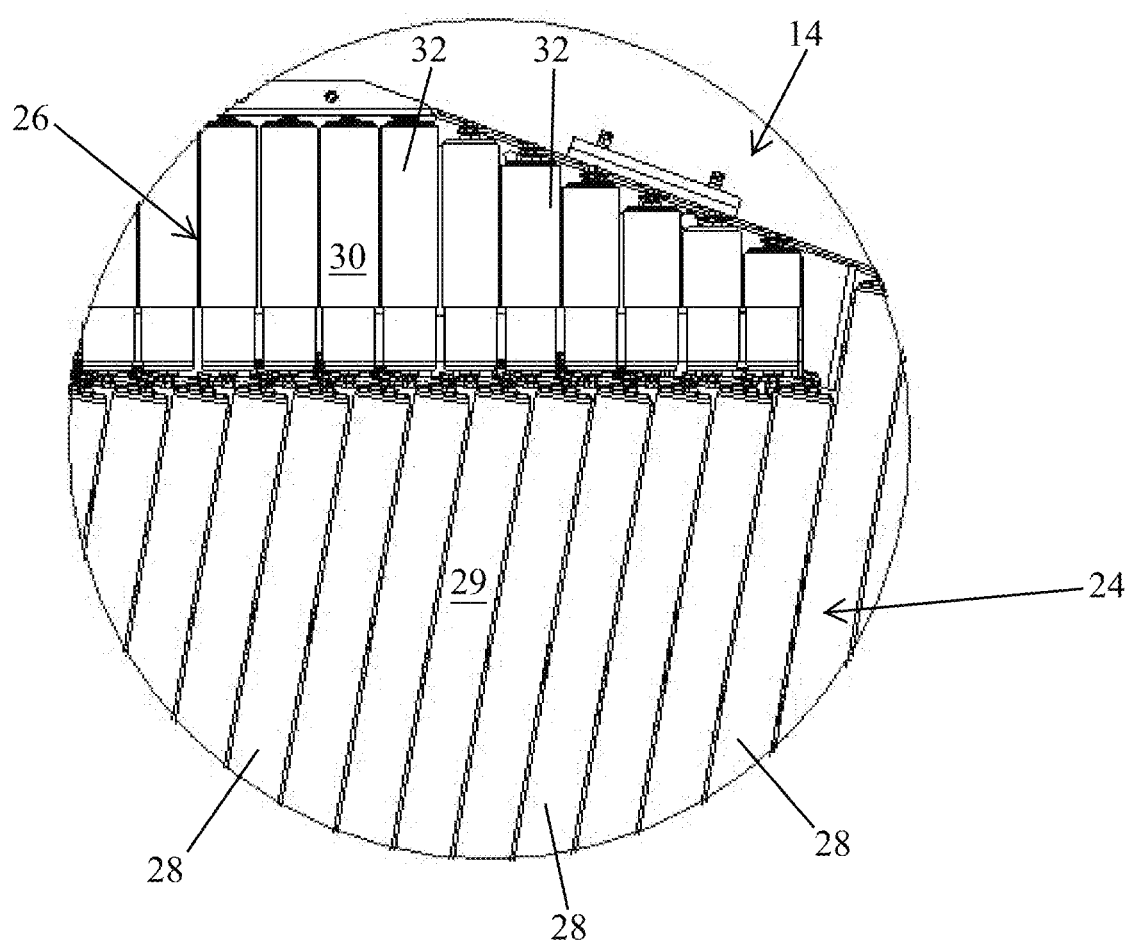
FIG. 3A is an enlarged plan view of the area designated 3A in FIG. 3.
Figure 4:
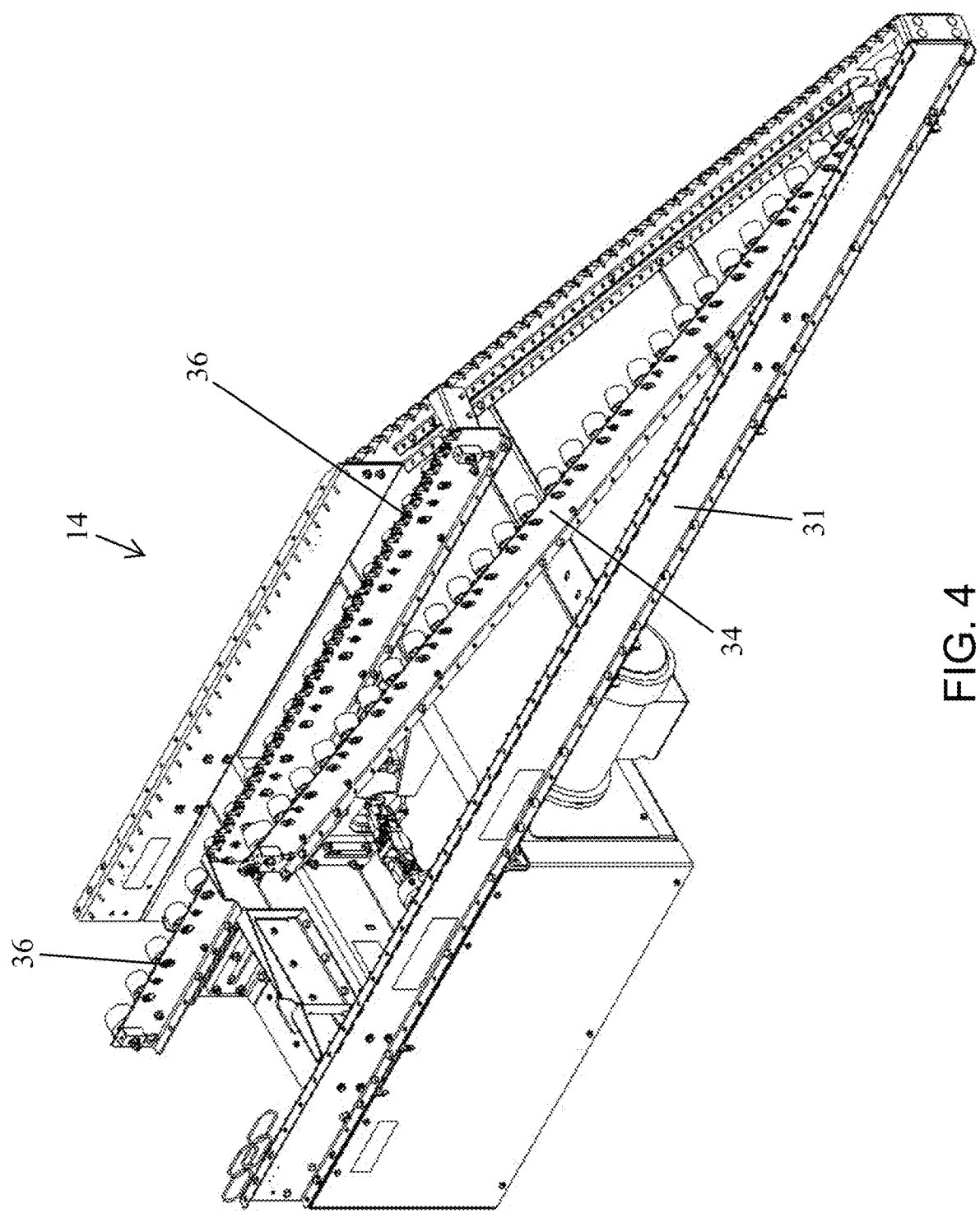
FIG. 4 is the same view as FIG. 2 showing the take-away lane with the rollers removed to reveal details of roller drive assemblies.
Figure 5:
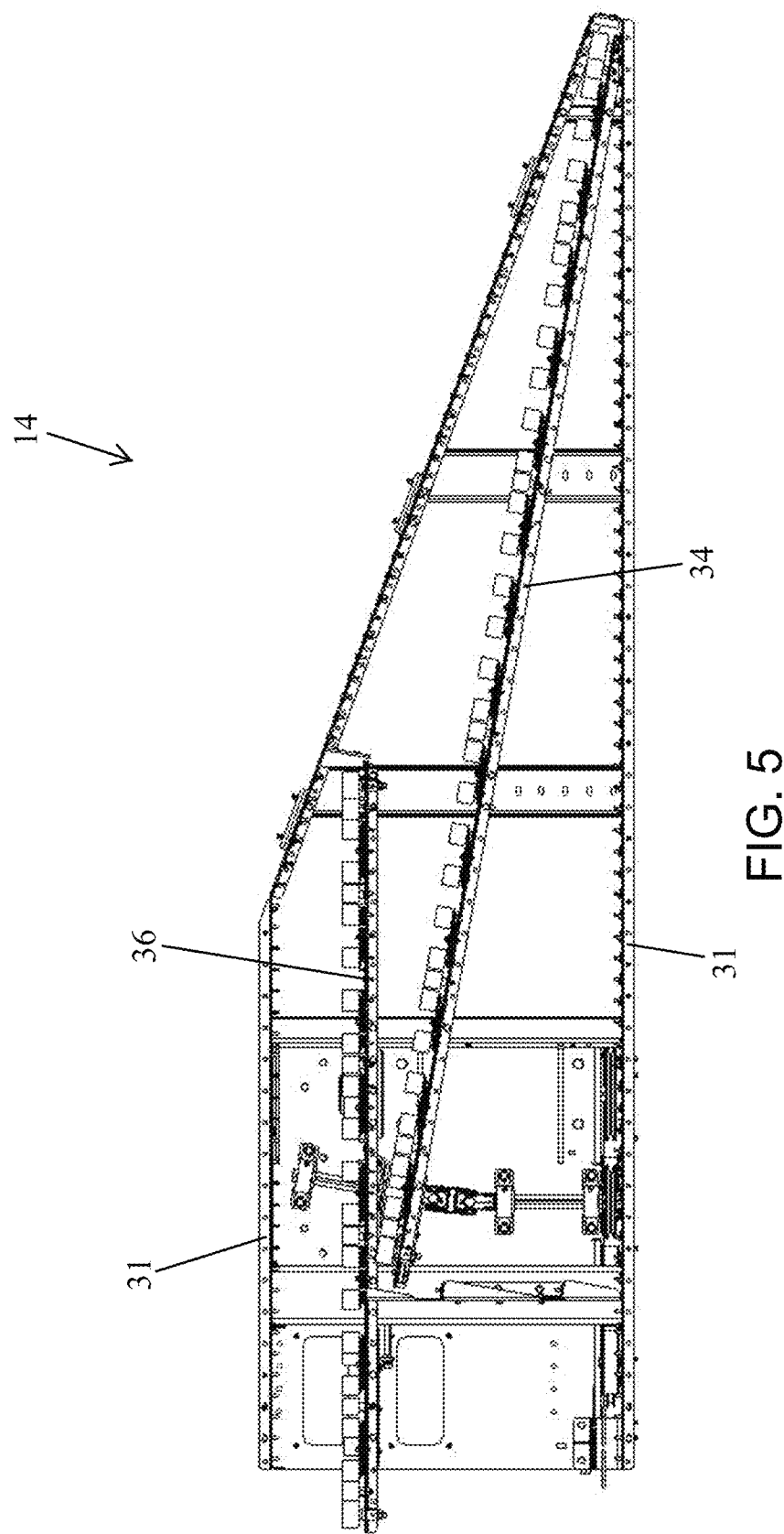
FIG. 5 is a top plan view of the take-away lane in FIG. 4.
Figure 6:
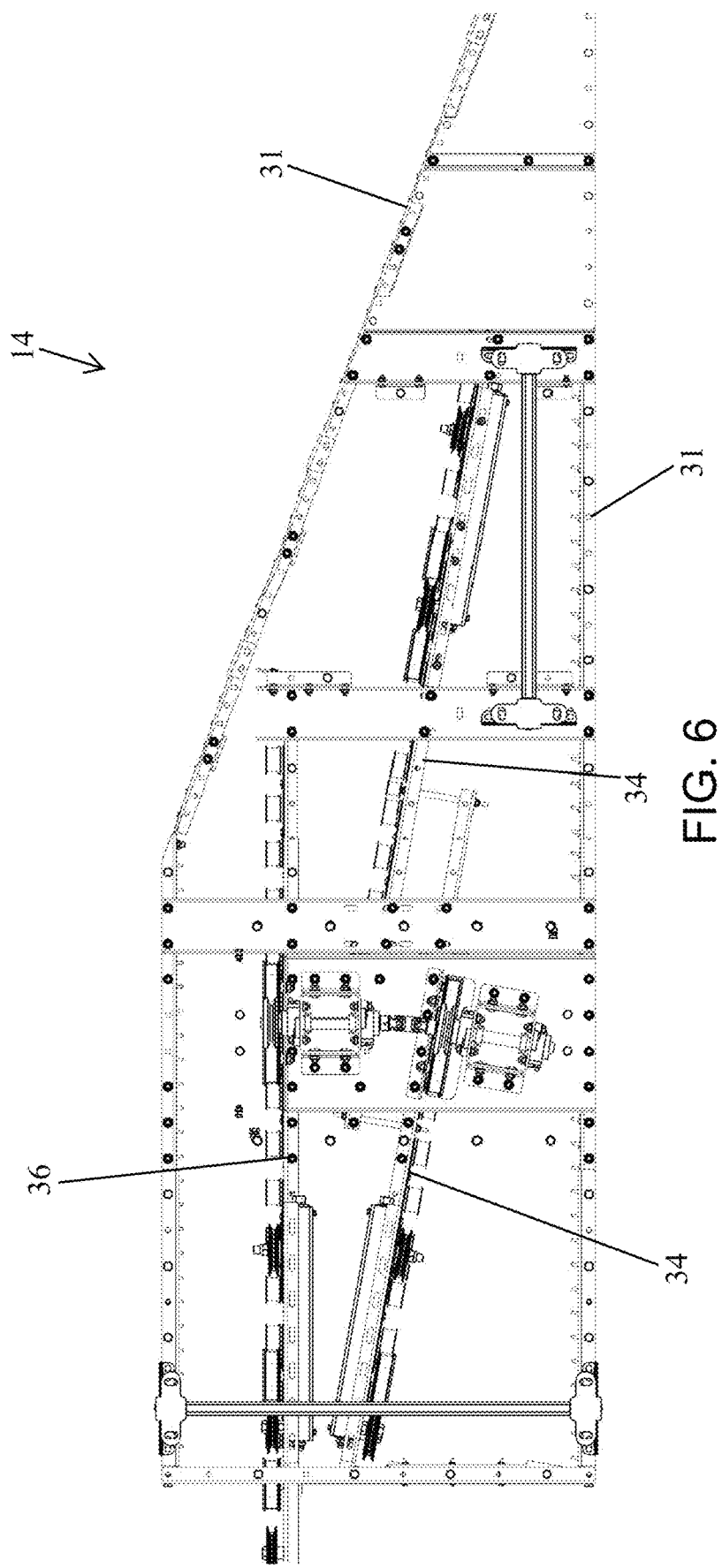
FIG. 6 is a top plan view of another take-away lane with the rollers removed to reveal details of roller drive assemblies.

Second portion 26 has a surface 30 with a higher friction than a surface 29 of first portion 24. (FIG. 3A) Second portion 26 may be made up of a high-friction belt (not shown). Second portion 26 may be made up of a plurality of high-friction parallel rollers 32 as in the illustrated embodiment. (FIGS. 3 and 3A). Parallel rollers 28 of first portion 24 are not co-axial with respect to the parallel rollers 32 of second portion 26. Separate belted drive assemblies 34 and 36 drive the parallel rollers 28 of first portion 24 and parallel rollers 32 of second portion 26. (FIGS. 4-6) While the separate belted drive assemblies 34, 36 could drive conveying surface 22 in first portion 24 and second portion 26 at different speeds, in the illustrated embodiment they are driven at generally the same conveying speed. Rollers 28, 32 and drive assemblies 34, 36 are supported by a frame 31.

Figure 7:
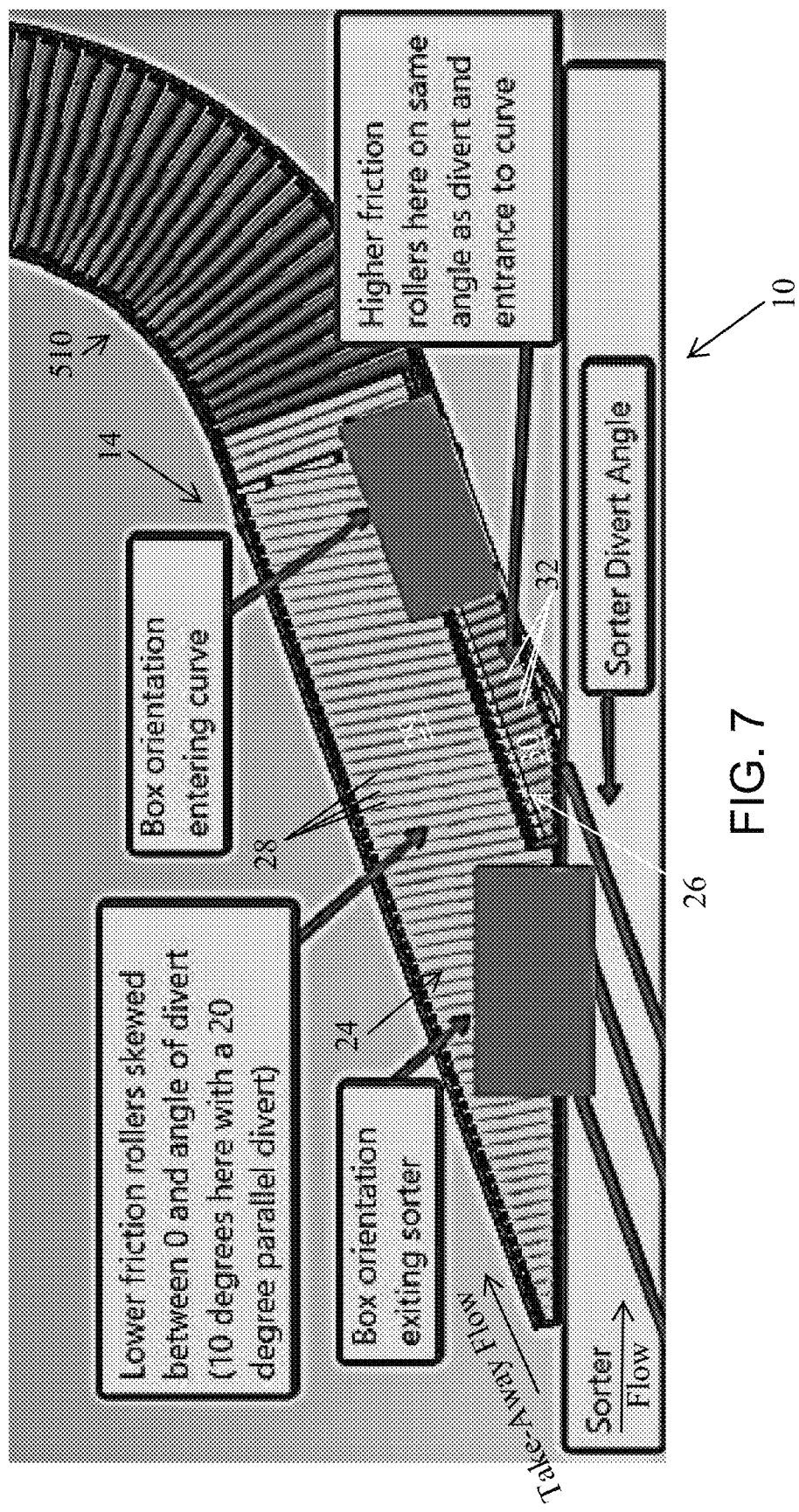
FIG. 7 is a top plan view illustrating operation of the positive displacement sorter in FIG. 1.

Thus, as illustrated in FIG. 7, articles entering take-away lane 14 in a generally longitudinal orientation after having been parallel diverted, get biased toward second portion 26 by the relative angle of rollers 28 of first portion 24. When a portion of the article comes into contact with the high friction surface 30 of second portion 26, second portion 26 takes over handling of the article which leads the article in the direction of movement of conveying surface 22 which resists any contact with a downstream interface between sorter 10 and take-away lane 14 where articles could get jammed.

Figure 8:
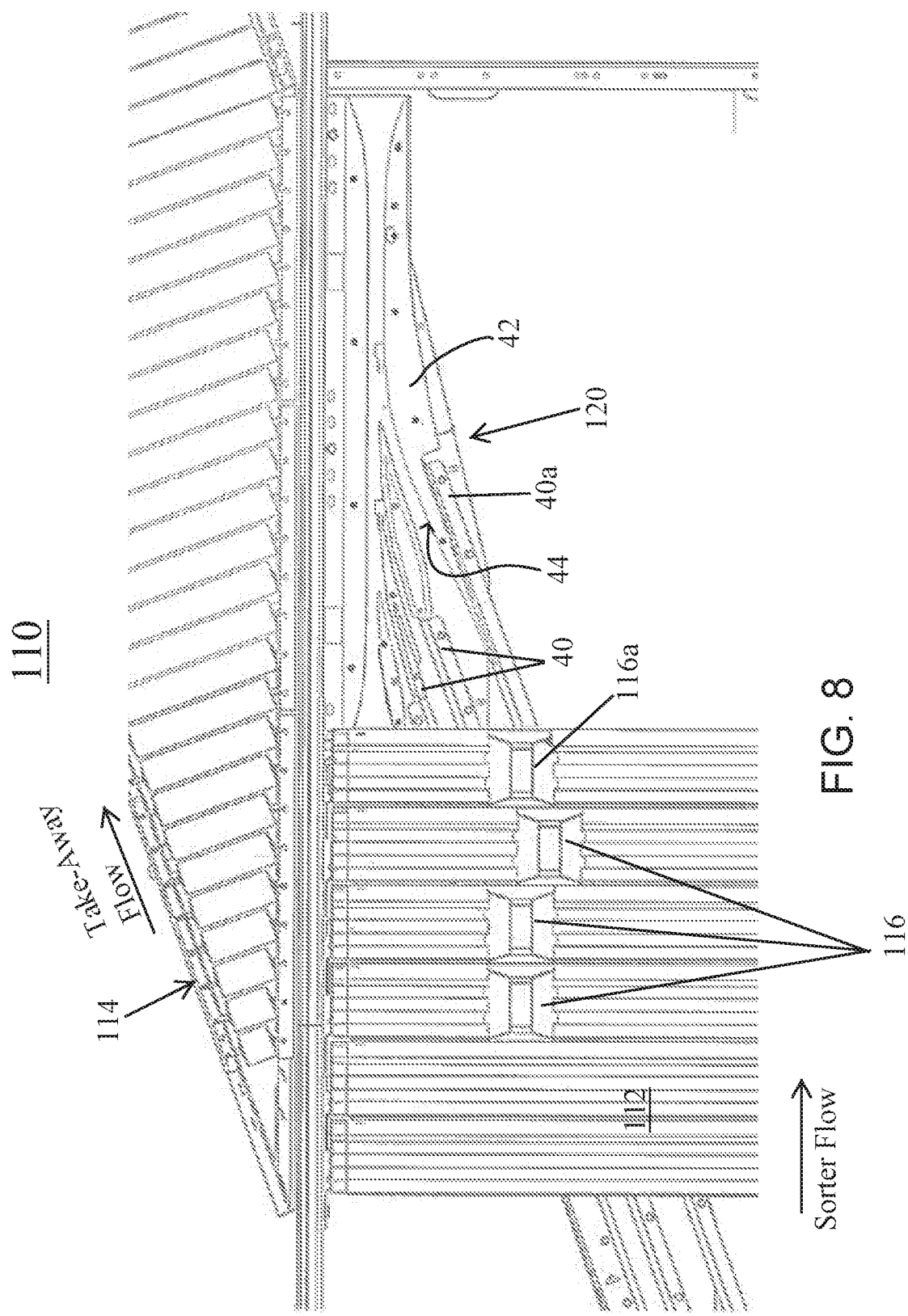
FIG. 8 is a top plan view of a positive displacement sorter according to another embodiment of the invention illustrating pushers displacing an article toward the take-away lane.
Figure 9:
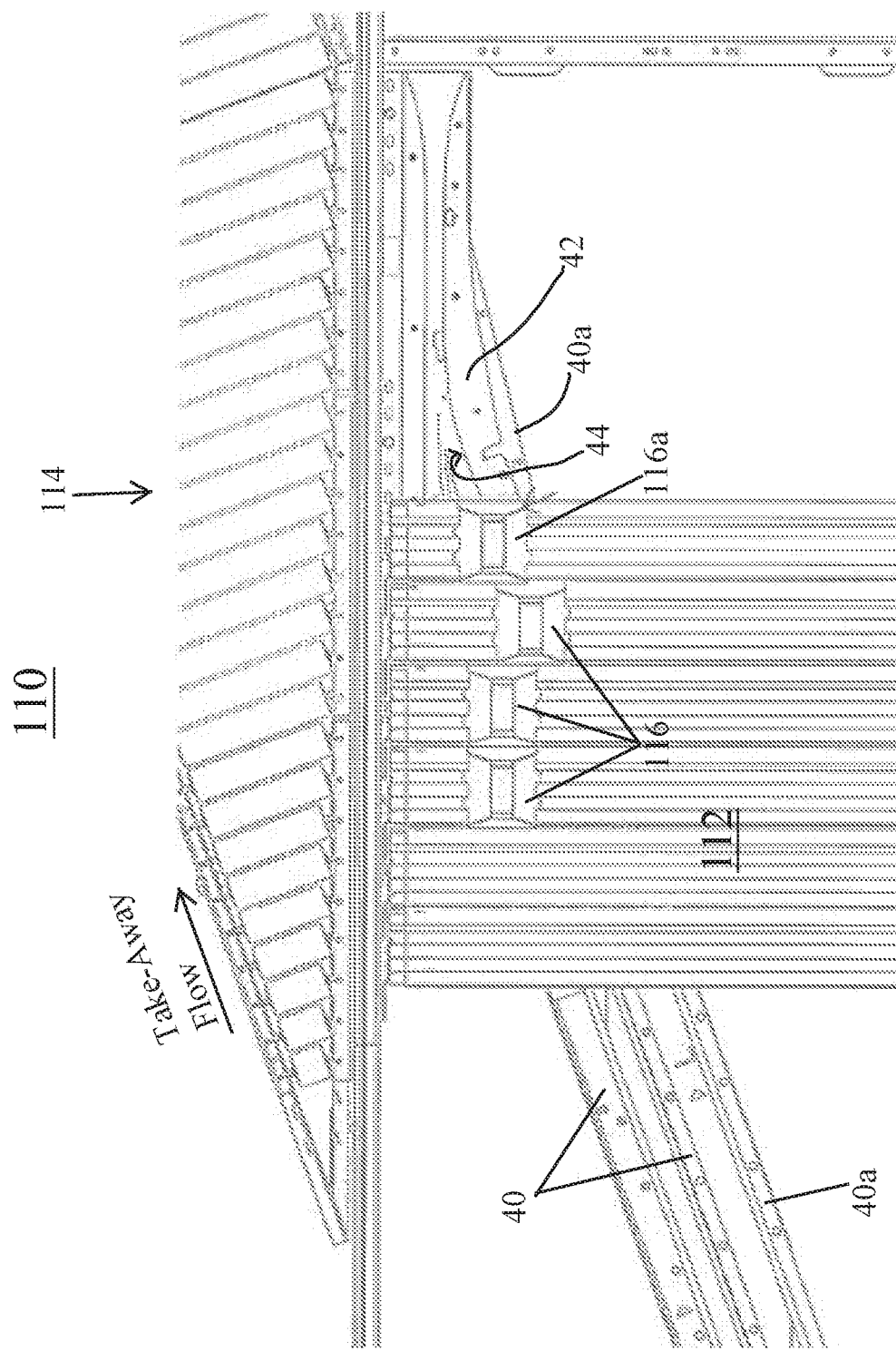
FIG. 9 is the same view as FIG. 8 illustrating the pusher shoes approaching the terminal portion of the displacement of the article.
Figure 10:
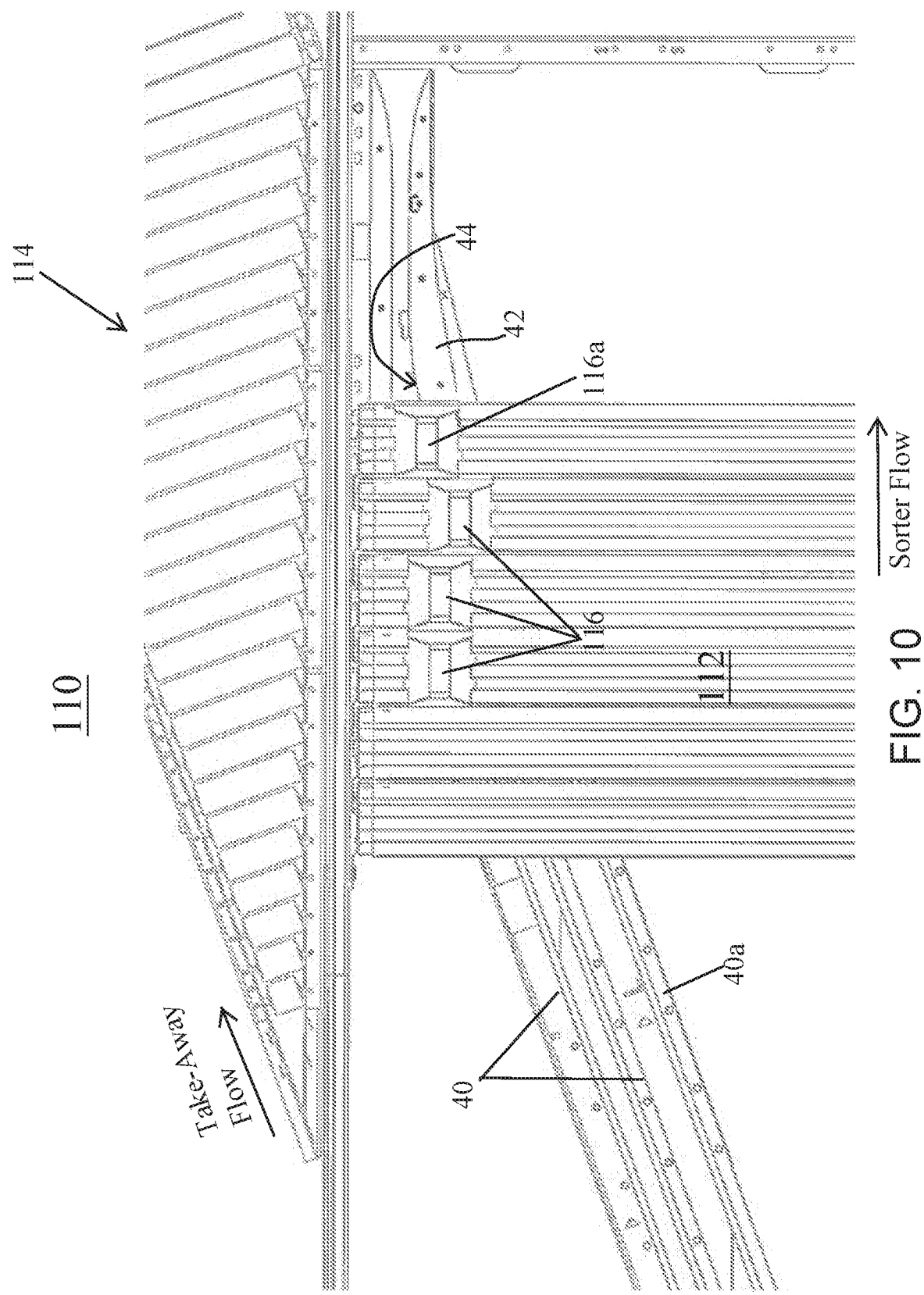
FIG. 10 is the same view as FIGS. 8 and 9 illustrating the pusher shoes at the terminal portion of displacement of the article.

An alternative positive displacement sorter 110 includes a conveying surface 112 configured to convey articles in a longitudinal direction. At least one diagonal take-away lane 114 extends diagonally from conveying surface 112 to receive articles being diverted from conveying surface 112. As illustrated in FIGS. 8-10, a plurality of pushers 116 are configured to move together in a lateral direction to displace an item on conveying surface 112 to diagonal take-away lane 114. A rotational system 120 is configured to rotate a diverted item in the direction of the take-away lane. Rotation system 120 includes a leading one 116a of pushers 116 being configured to accelerate at a terminal portion of the displacement of the article on conveying surface 112 as illustrated in FIG. 10.

This is accomplished by sorter 110 having a plurality of generally parallel diagonal diverting rails 40 under conveying surface 112 that engage a downward facing pin (not shown) from each pusher 116. The distal portion of the downstream-most diverting rail 40a includes a kicker 42 having a surface 44 at a steeper angle than the rest of the rail portions. The steeper angle of surface 44 causes the leading pusher 116a to travel ahead of the other pushers 116 at the terminal end of the divert adjacent take-away lane 114. This causes the leading portion of the article to be rotated in the direction of the take-away lane 114 in order to become more directed in the conveying direction of conveying surface 122 of take-away lane 114 in order to reduce the risk of jams at the take-away lane 114 or downstream of the take-away lane 114.

Figure 11:
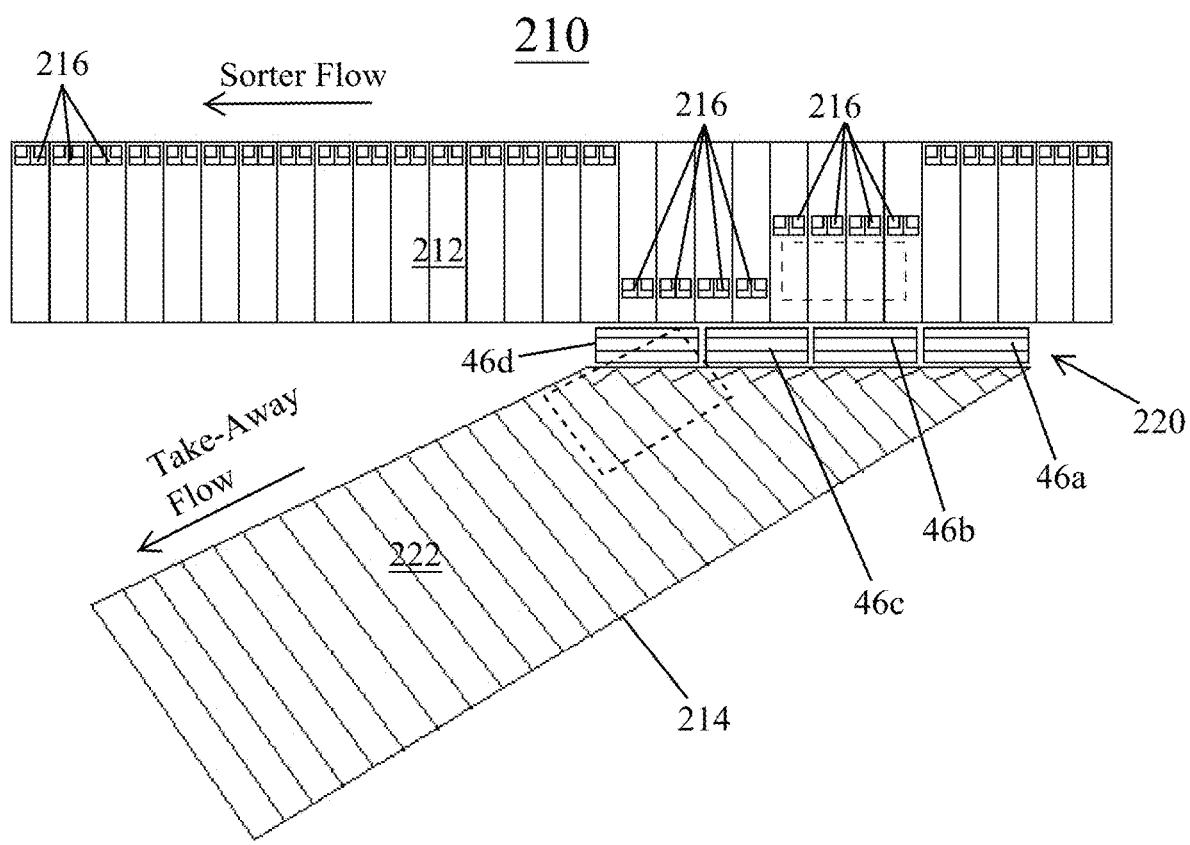
FIG. 11 is a top plan view of a positive displacement sorter according to yet another embodiment of the invention.

Another alternative positive displacement sorter 210 includes a conveying surface 212 that is configured to convey articles in a longitudinal direction. (FIG. 11). Sorter 210 includes at least one diagonal take-away lane 214, extending diagonally from conveying surface 212 to receive articles being diverted from conveying surface 212. A plurality of pushers 216 are configured to move together in a lateral direction in order to displace an item on conveying surface 212 to diagonal take-away lane 214. A rotational system 220 is configured to rotate a diverted item in the direction of take-away lane 214. Rotation system 220 includes at least one driven roller 46 that is oriented in the longitudinal direction at an interface between conveying surface 212 and diagonal take-away lane 214.

Roller 46 is rotated away from conveying surface 212. Thus, as a diverted article makes contact with driven roller 46, the leading portion of the article will contact roller 46 which will pull the leading portion toward the conveying surface 222 of take-away lane 214. Such roller 46 may also be referred to as a spitter roller. Driven roller 46 is illustrated as made up of a plurality of co-axial driven rollers, or sets of rollers, 46a, 46b, 46c, and 46d that are driven at greater rotational speeds in a longitudinal direction from upstream to downstream. Thus, as the article makes contact with driven rollers 46a-46d, the leading portion of the article will be driven at a faster speed from conveying surface 212 which will rotate the leading portion of the article toward take-away lane 214. The goal is to rotate the article approximately the angle of the conveying surface 222 of take-away lane 214 with respect to conveying surface 212 of sorter 210. Driven roller 46 may have an enhanced-friction surface.

Figure 12:
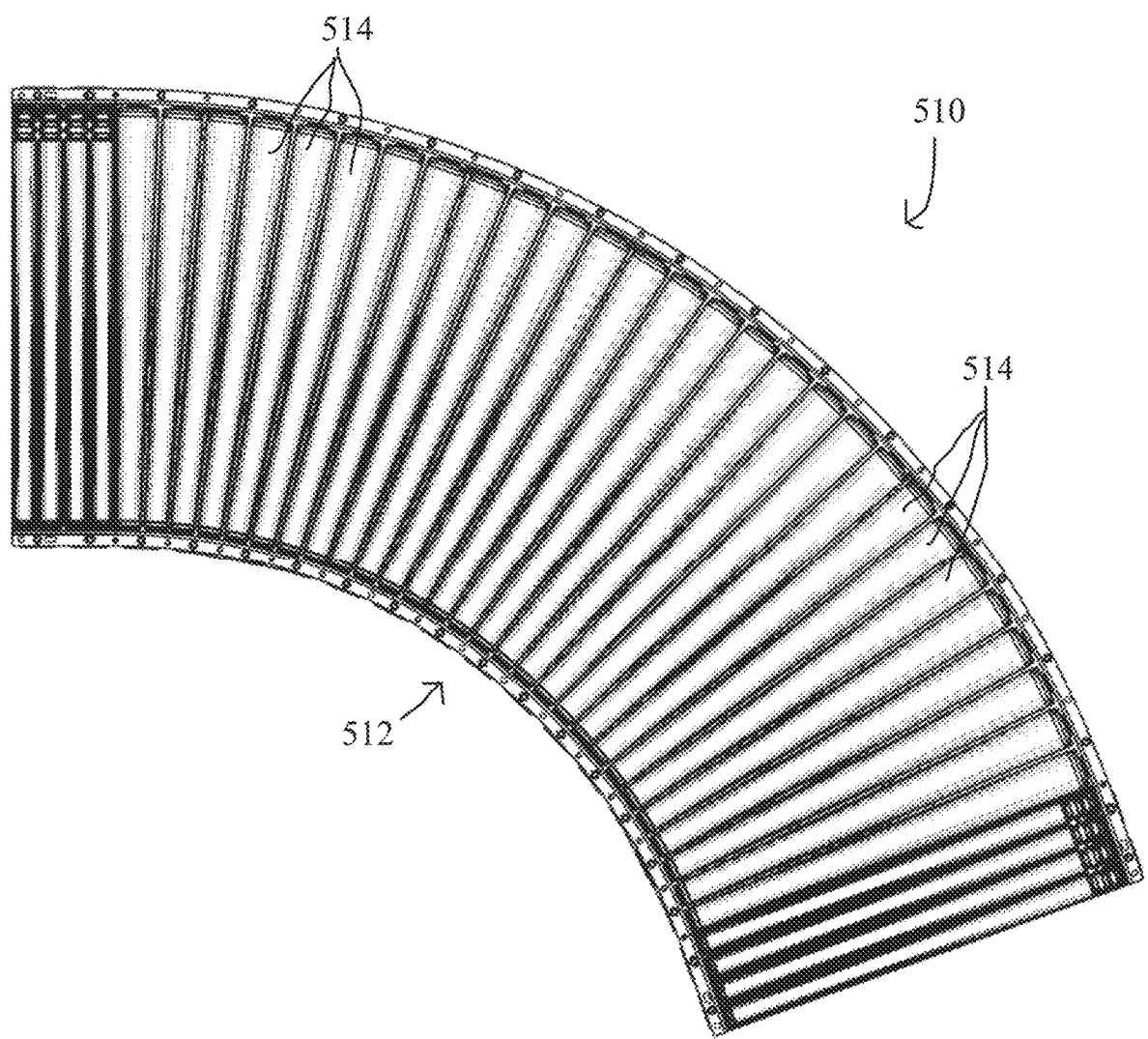
FIG. 12 is a plan view of a live roller curve conveyor including tapered rollers.
Figure 13:
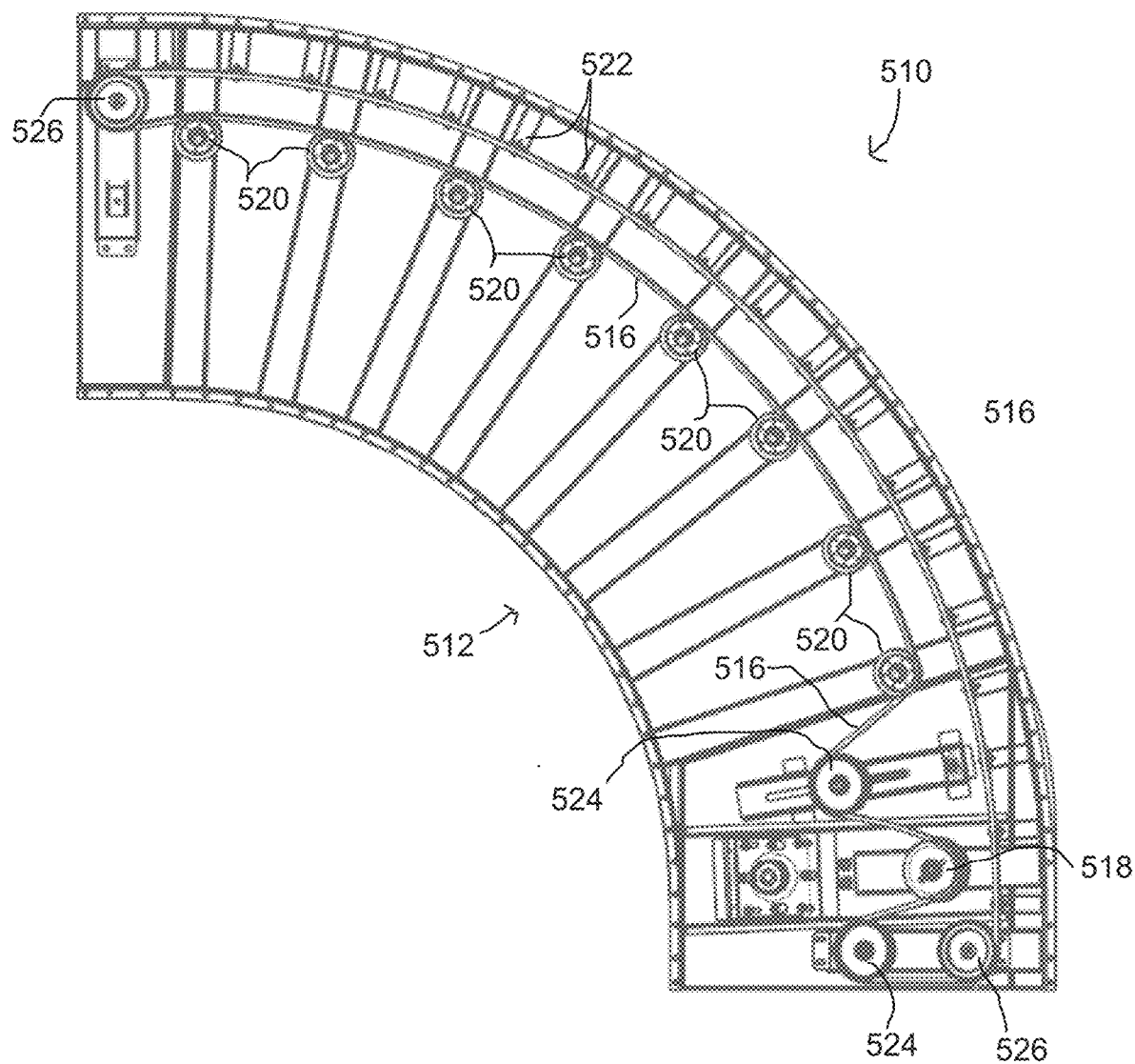
FIG. 13 is a plan view of a belt drive system for the live roller curve conveyor of FIG. 12.
Figure 14:
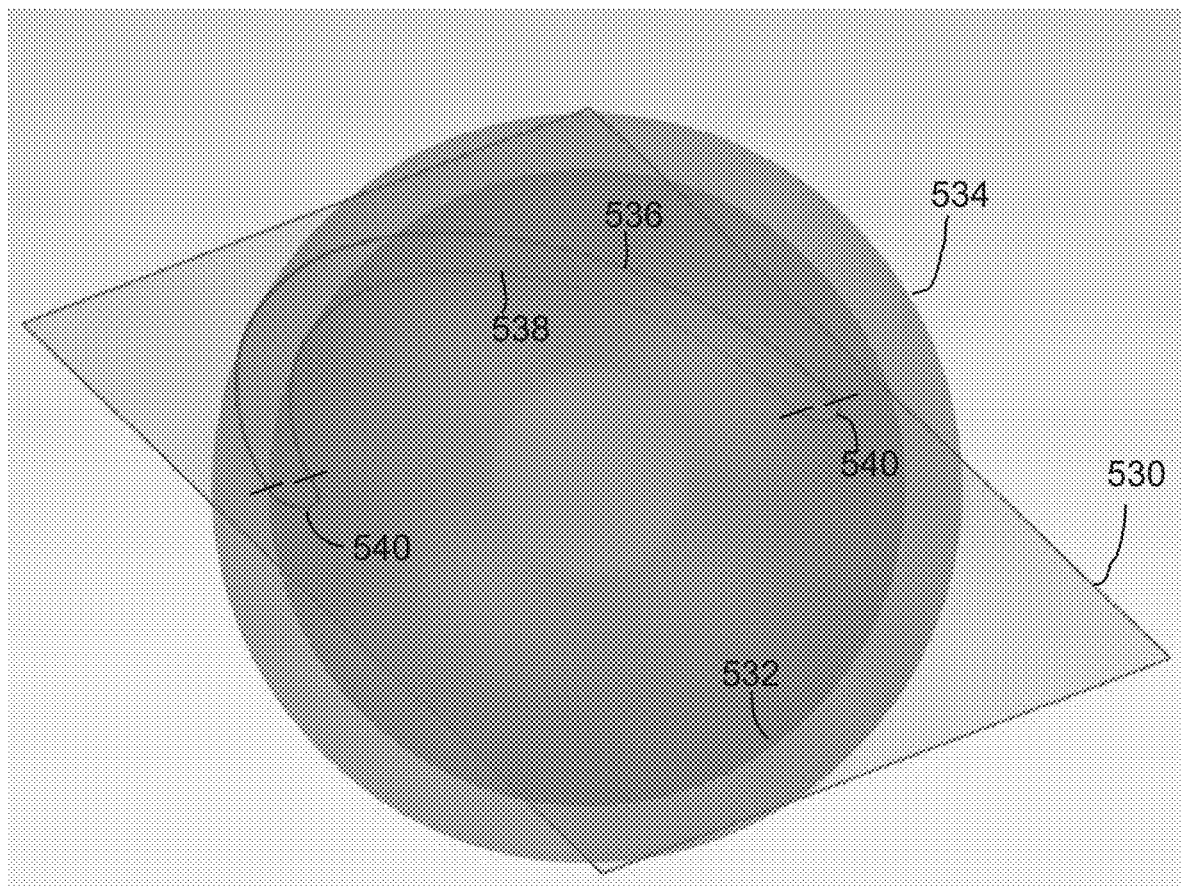
FIG. 14 is a diagram illustrating a conical drive plane defined by a plane bisecting two spheres of different radii.

A curved path live roller conveyor 512 may be included downstream of the take-away lane 14 (FIGS. 1 and 12). The curved path live roller conveyor 512 includes a belt drive system 510 to drive tapered rollers 514 of the curved path live roller conveyor 512. Drive system 510 includes a drive belt 516, a motor driven pulley 518, a plurality of drive belt guide pulleys 520, a plurality of support pressure assemblies 522, at least one take-up pulley 524, and a plurality of line end pulleys 526 (FIG. 13). The motor driven pulley 518, guide pulleys 520, pressure assemblies 522, take-up pulleys 524, and line end pulleys 526 are all disposed within a single plane such that drive belt 516 is maintained in a single conical drive plane 528 of operation (FIG. 14). While the curved path live roller conveyor 512 is shown with the take-away lane 14 in the illustrated embodiments, the curved path conveyor 512 may be included with other conveyor systems.

The term "conical drive plane" as used hereafter is defined by a plane 530 bisecting two concentric spheres, 532 and 534, such that the arc defined by the intersection of plane 530 and sphere 534 defines an outer arc 536 of conical drive plane 528 and the arc defined by the intersection of plane 530 and sphere 532 defines an inner arc 538 of conical drive plane 528. Sphere 532 has a diameter that is smaller than the diameter of sphere 534. The angle of plane 530 is determined by the relationship between the radius of the curved path live roller conveyor 512 and the angle of the rollers 514 around the curve, such that as the drive belt 516 is driven along the outer arc 536, the pressure assemblies 522 provide support to the drive belt 516 to maintain the drive belt 516 in contact with the tapered rollers 514 along the curved section of the live roller conveyor 512. Thus, the friction between drive belt 516 and tapered rollers 514 drives the tapered rollers 514 (FIG. 13).

Figure 15A:
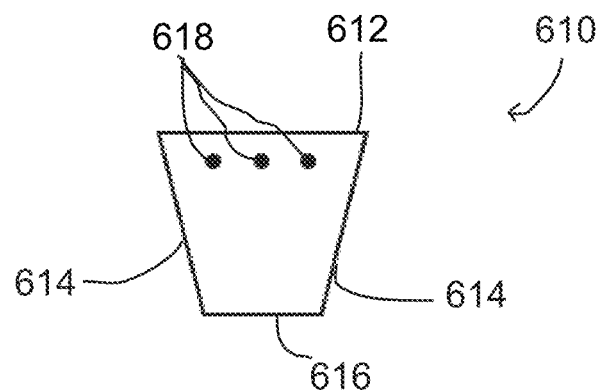
FIG. 15A is a cross-sectional view of a v-belt of the belt drive system.
Figure 15B:
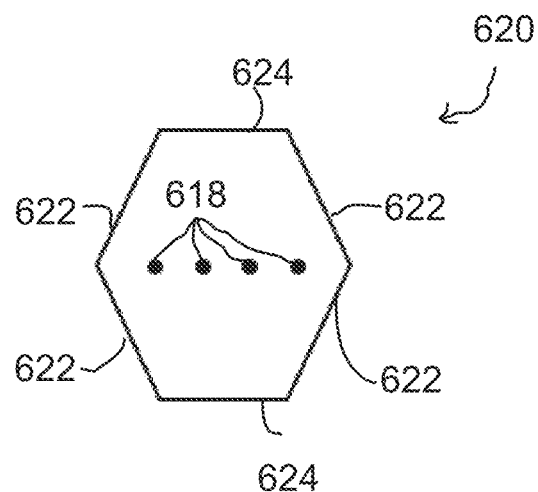
FIG. 15B is a cross-sectional view of a double v-belt of the belt drive system.

Drive system 510 may utilize v-belts, double v-belts, or similar drive belts, to provide increased life expectancy and longevity of the drive belt. V-belts have trapezoidal cross-sections 610, including a top surface 612, two angled side surfaces 614, a bottom surface 116, and a plurality of tension cords 618 disposed near the top surface 612 (FIG. 15A). Side surfaces 614 and bottom surface 616 are configured for frictionally driving pulleys, bearings, rollers, or the like. Double v-belt pulleys have hexagonal cross-sections 620 including four angled side surfaces 622, two end surfaces 624, and a plurality of tension cords 618 disposed in the middle of the belt between the two end surfaces 624 (FIG. 15B). Side surfaces 622 and end surfaces 624 are configured for frictionally driving pulleys, bearings, rollers, or the like. The drive belt 516 is configured such that the tension cords 618 are oriented substantially perpendicular to the conical drive plane 528 during operation of the drive system 510, such that the tension cords 618 pass over and around the pulleys of the drive system 510 without twisting or bending. Twisting and bending of the tension cords 618 causes un-equal tension across the tension cords 618 when the drive belt 516 passes over or around pulleys. Un-equal tension causes stress and wear on the tension cords 618, eventually causing breakage of the drive belt 516 and failure of the drive system 510.

Figure 16:
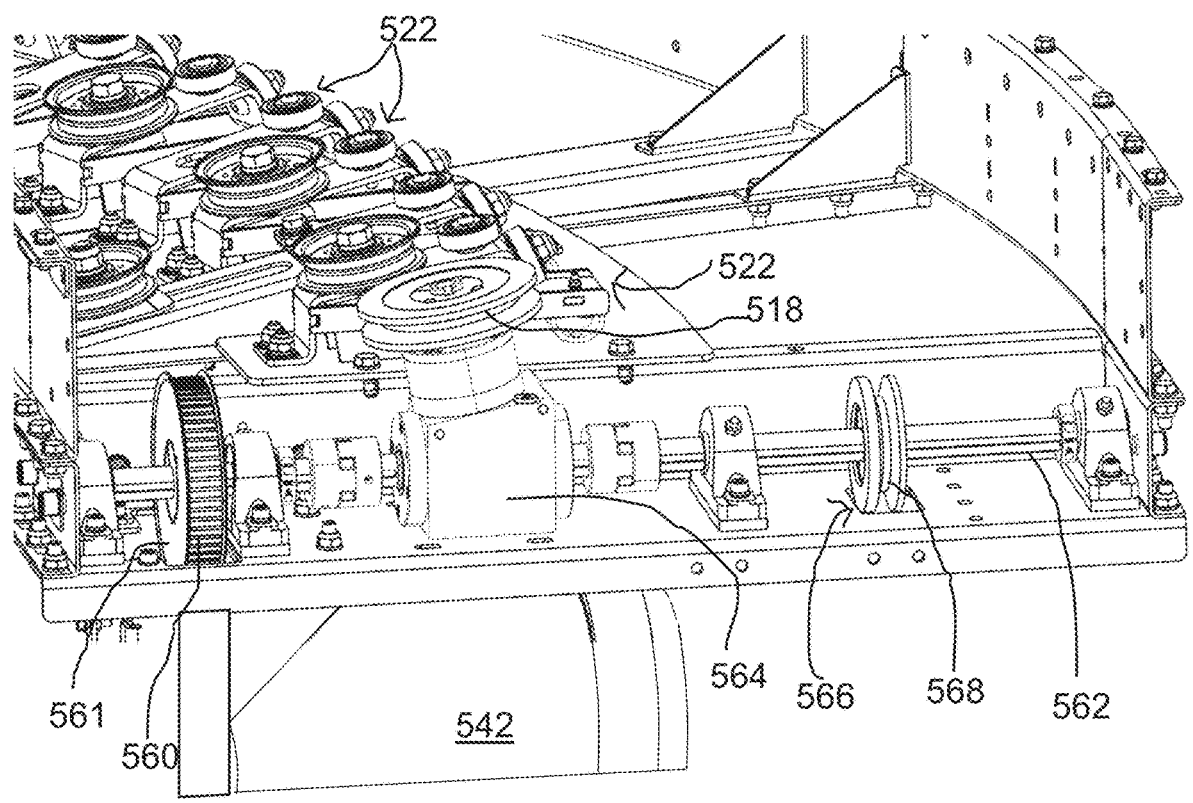
FIG. 16 is a perspective view of the belt drive system of FIG. 13 without a drive belt.

Guide pulleys 520 are disposed in spaced arrangement on the inner arc 538 of the curved live roller conveyor 512. Pressure assemblies 522 are disposed in spaced arrangement on the outer arc 536 (FIGS. 13 and 14). The arc of the pressure assemblies 522 being spaced apart from the arc of the guide pulleys 520 such that the drive belt is substantially uninhibited by the arrangement. Line end pulleys 526 are disposed at the ends of the curved live roller conveyor 512 and define direction transitions of the drive path of the drive belt 516. The motor driven pulley 518 is disposed within the conical drive plane 528 of the drive system 510 and is driven by a motor 542 (FIG. 16). The motor driven pulley 518 drives the drive belt 516 along the drive path of the drive belt 516. At least one take-up pulley 524 is disposed along the drive path of drive belt 516 within the conical drive plane 528 of the drive system 510 to maintain tension on the drive belt 516 and take up any slack in the drive belt 516 during operation of the drive system 510. Tapered rollers 514 are disposed along the curve of the live roller conveyor 512 such that the underside or belt side of the tapered rollers 514 are in contact with drive belt 516 (FIG. 17).

Figure 17:
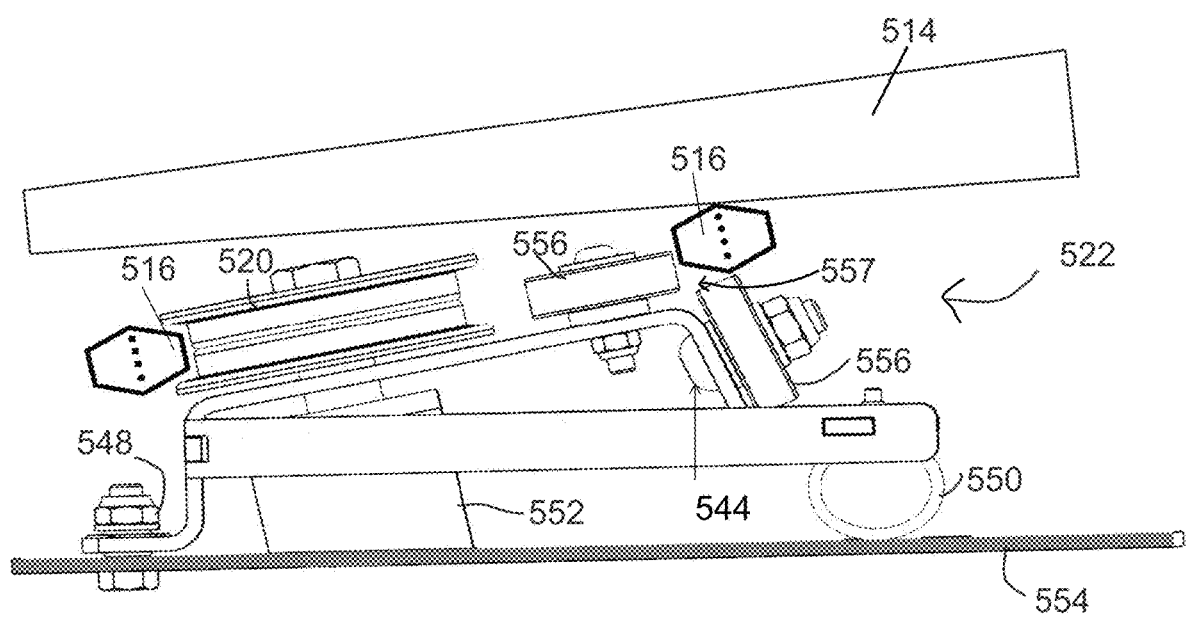
FIG. 17 is a side elevational view of a support pressure assembly of the belt drive system.
Figure 18:
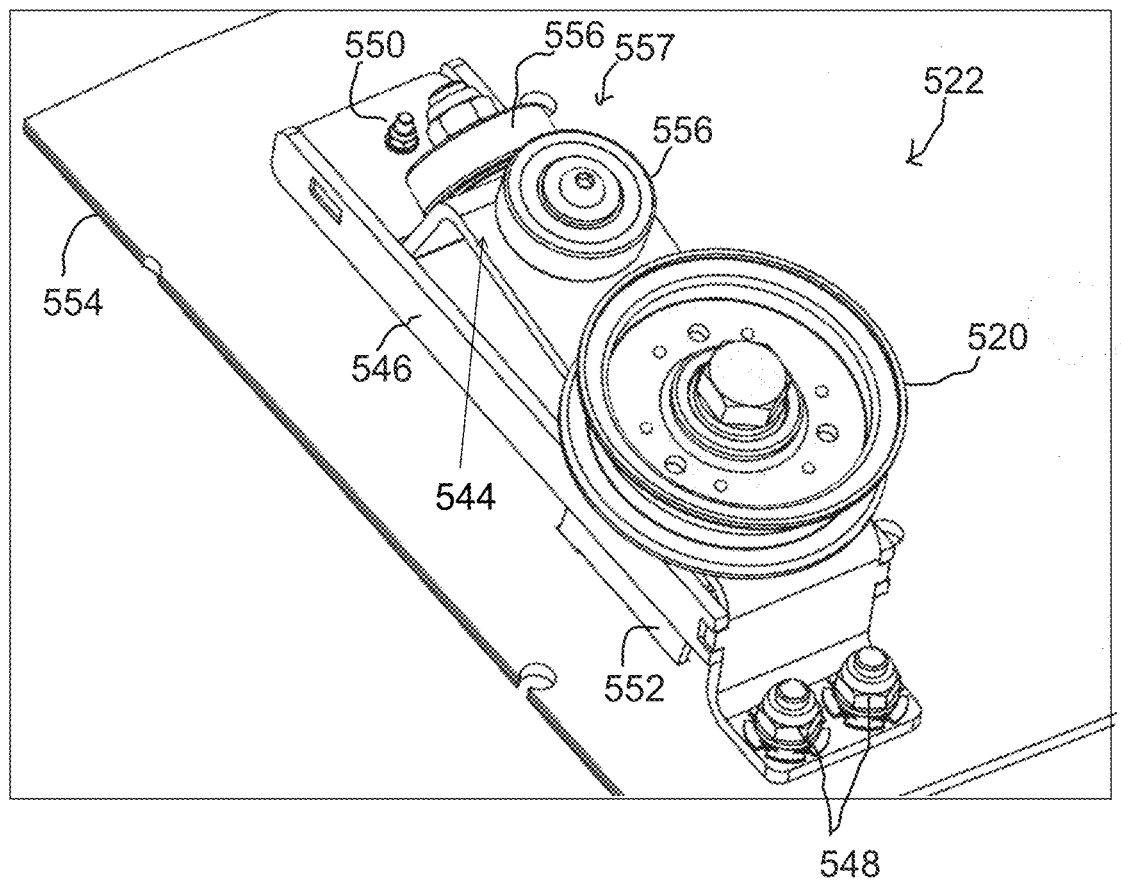
FIG. 18 is a perspective view of a support pressure assembly of the belt drive system in FIG. 17.

In the illustrated embodiment of FIGS. 17 and 18, support pressure assembly 522 includes a pulley system 544, a support frame 546, a pin-type fastener 548, and a shock absorbing support 550. Support frame 546 provides a rigid mount for the pulley system 544. Support frame 546 is attached at one end to a frame 554 of the live roller conveyor 512 by the pin-type fastener 548 and is supported at the opposite end by the shock absorbing support 550. The shock absorbing support 550 reduces and dampens vibration of the support pressure assembly 522 during the operation of the drive system 510 while maintaining pressure between the drive belt 16 and the rollers 514. The shock absorbing support 550 may be a bumper of rubber material such as shown in FIG. 17. The pin-type fastener 548 is capable of withstanding vibration and minor movement of the support frame 546.

Figure 19:
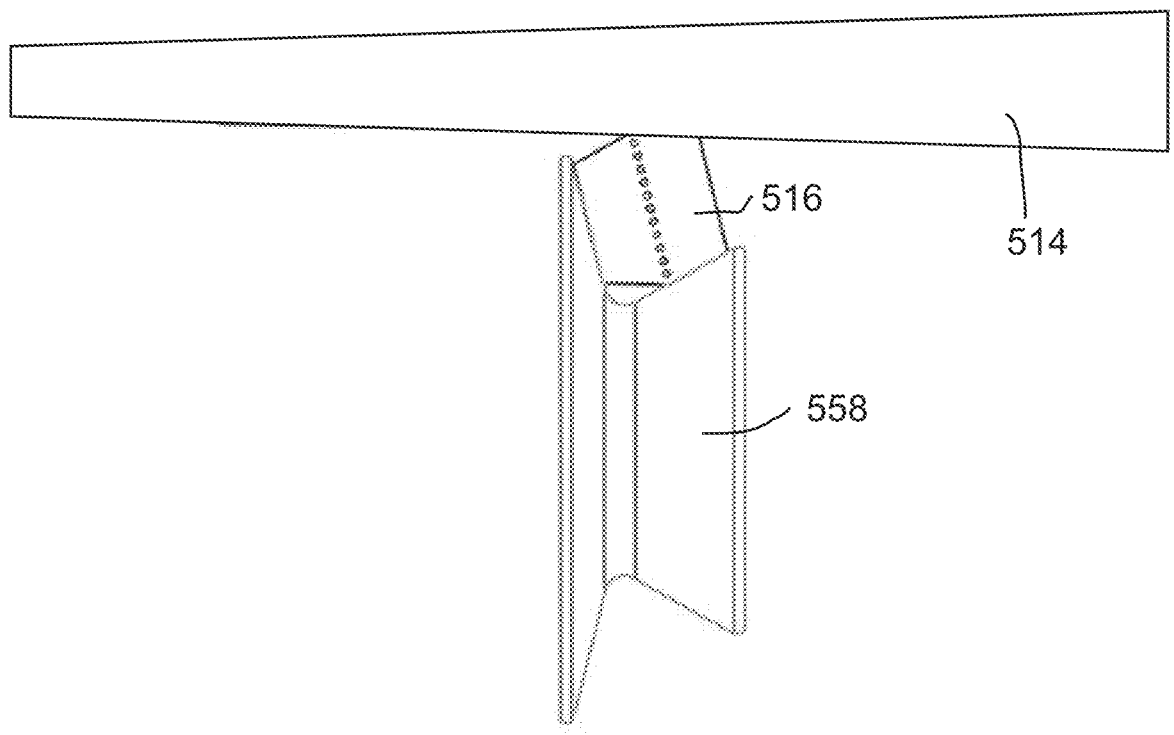
FIG. 19 is a side elevational view of a tapered v-belt pulley for guiding a double v-belt according to an embodiment of the invention.

In the illustrated embodiment of FIG. 17, pulley system 544 of pressure assembly 522 includes a set of two roller bearings 556 disposed substantially perpendicular to each other, such that bearings 556 support or cradle the drive belt 516. The space between the two roller bearings 556 defines a support cradle 557 for the drive belt 516. The support cradle 557 of each of the plurality of support assemblies 522 define the drive path of the drive belt 516 corresponding to the outer arc 536 of the conical drive plane 528. In another embodiment, as illustrated in FIG. 19, pulley system 544 includes a v-belt pulley 558 to support the drive belt 516. The v-belt pulley 558 may be mounted to support frame 546 or directly to frame 554. The v-belt pulleys 558 of the plurality of support assemblies 522 define the drive path of the drive belt 516 corresponding to the outer arc 536 of the conical drive plane 528.

In the illustrated embodiment, the guide pulley 520 is mounted on a support mount 552 (FIGS. 17 and 18). The support mount 552 is rigidly fixed to frame 554 of the live roller conveyor 512. A hole is disposed through support frame 546 to allow the support mount 552 to pass through the support frame 546 such that guide pulley 520 is mounted to frame 554 independent of the support pressure assembly 522. Pressure applied to the rollers 514 by the drive belt 516 is lowered by mounting the guide pulley 520 independent of the support frame 546. In another embodiment, the guide pulley 520 may be fixedly mounted to the support frame 546. The guide pulley 520 is directly mounted to support frame 546 to maintain the guide pulley 520 and the support pressure assembly 522 within the conical drive plane 528 at all times. Pressure applied to the rollers 514 by the drive belt 516 is increased by mounting the guide pulley 520 directly to the support frame 546.

Figure 20:
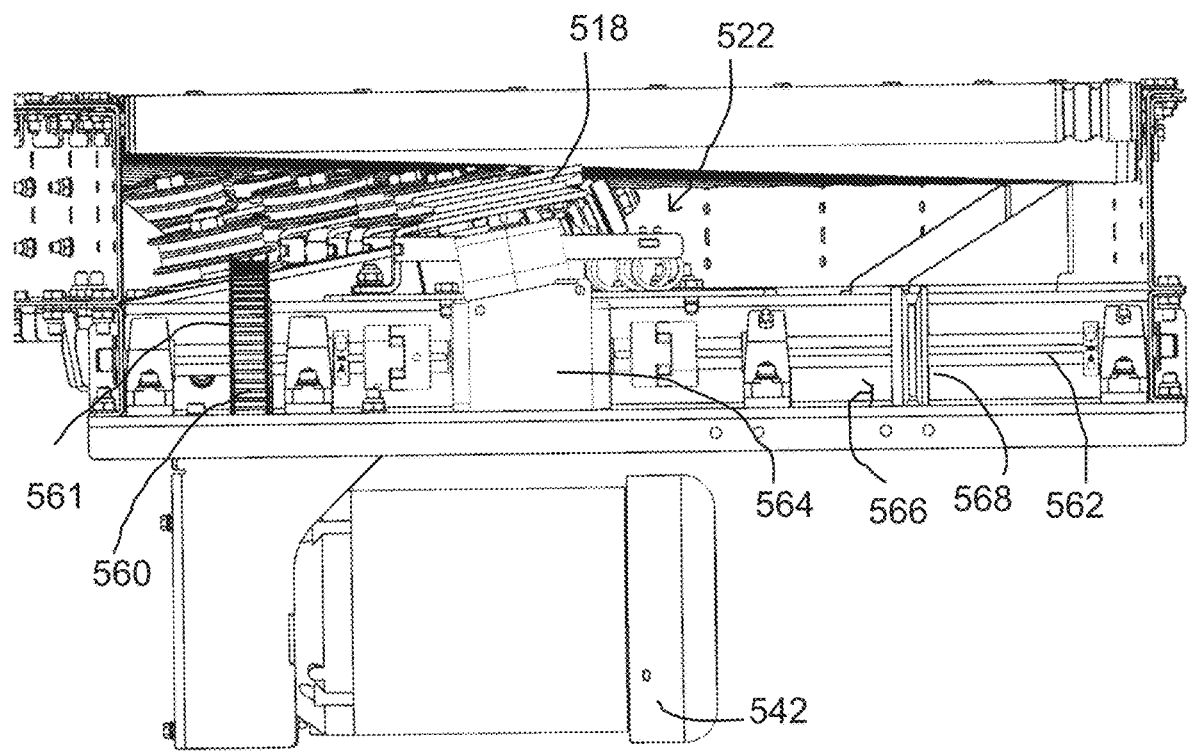
FIG. 20 is a side elevational view of an embodiment of a curved roller conveyor belt drive system of FIG. 12 including a drive motor, a drive shaft, and a gear box connected to the drive shaft to drive the drive belt.
Figure 21:
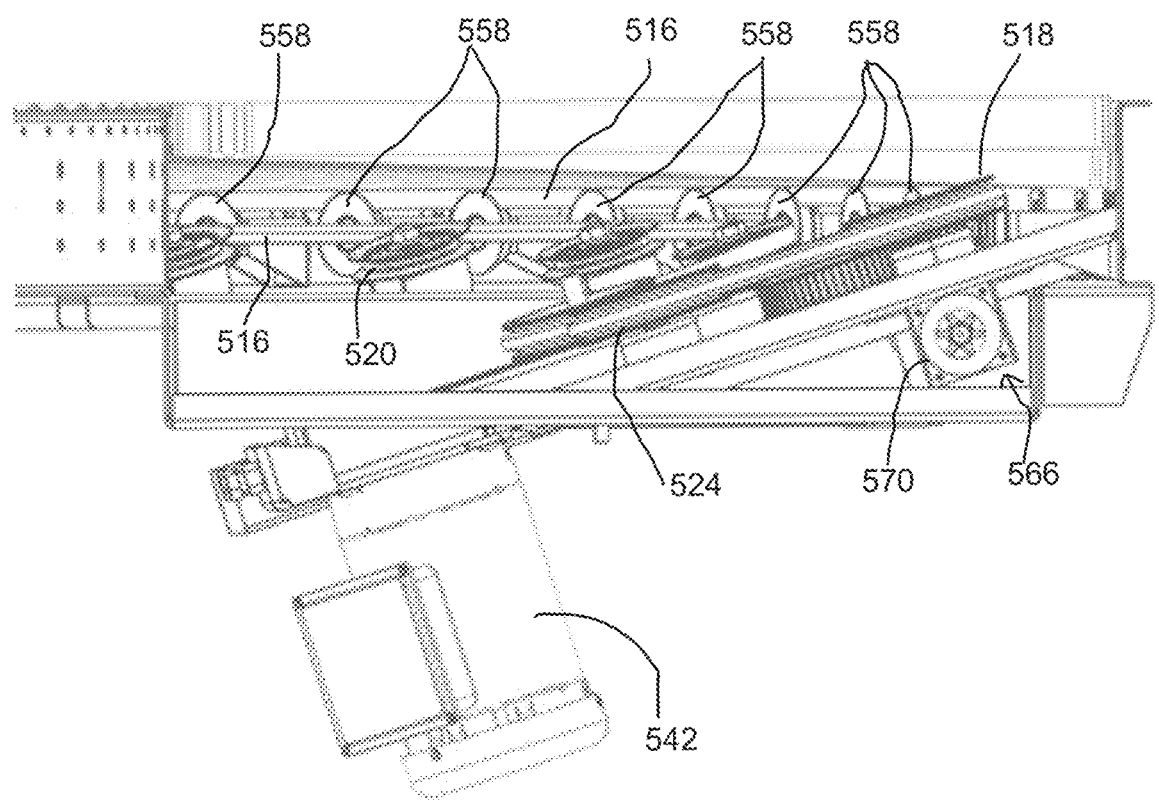
FIG. 21 is a side elevational view of another embodiment of a curved roller conveyor belt drive system including a drive motor for directly driving the drive belt.

In the illustrated embodiment of FIG. 20, motor 542 is disposed below the live roller conveyor 512 and mounted in an orientation non-planar with the conical drive plane 528 of the drive system 510. The motor 542 drives a gear belt 560 which drives a drive gear 561 disposed on an output shaft 562. A gear system 564 transfers the power from the output shaft 562 to the plane of the motor driven pulley 518 which is aligned with the conical drive plane 528. Optionally, as shown in FIG. 21, the motor 542 may be mounted perpendicular to the conical drive plane 528 of the drive system 510, such that the gear belt 560 is co-planar with the conical drive plane 528 and drives the motor driven pulley 518.

A power take off (PTO) 566 for driving slave conveyors or auxiliary conveyors may be disposed within the drive system 510. The PTO 566 may be defined by a pulley 568 disposed on the output shaft 562 or by a gear box 570 that is connected to and driven by the drive belt 516 (FIGS. 20 and 21). The PTO 566 may be configured to drive adjacent take-away conveyors, additional belt driven conveyors including curves, or the like.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A positive displacement sorter, comprising:
   a conveying surface configured to convey articles in a longitudinal direction;
   at least one diagonal take-away lane, extending diagonally from said conveying surface to receive articles being diverted from said conveying surface;
   a plurality of pushers configured to move together in a lateral direction to displace an item on said conveying surface to said diagonal take-away lane, wherein the item is displaced across said conveying surface in a longitudinal orientation that is parallel to the longitudinal direction of said conveying surface; and
   a rotational system that is configured to rotate a leading portion of a diverted article in the direction of the take-away lane.

2. A positive displacement sorter, comprising:
   a conveying surface configured to convey articles in a longitudinal direction;
   at least one diagonal take-away lane, extending diagonally from said conveying surface to receive articles being diverted from said conveying surface;
   a plurality of pushers configured to move together in a lateral direction to displace an item on said conveying surface to said diagonal take-away lane; and
   a rotational system that is configured to rotate a diverted article in the direction of the take-away lane once the article is diverted to said take-away lane.

3. The positive displacement sorter as claimed in claim 2, wherein said rotational system comprises a portion of said take-away lane.

4. The positive displacement sorter as claimed in claim 3, wherein said rotational system comprises another conveying surface having a first portion and a second portion, said first portion biasing articles toward said second portion, said second portion conveying articles in a direction of said take-away lane.

5. The positive displacement sorter as claimed in claim 4, wherein said first portion comprising a plurality of parallel rollers that are angled to convey in the direction toward said second portion.

6. The positive displacement sorter as claimed in claim 5, wherein said rollers at an angle of between 10 degrees and 20 degrees with respect to said second portion.

7. A positive displacement sorter, comprising:
   a conveying surface configured to convey articles in a longitudinal direction;
   at least one diagonal take-away lane, extending diagonally from said conveying surface to receive articles being diverted from said conveying surface;
   a plurality of pushers configured to move together in a lateral direction to displace an item on said conveying surface to said diagonal take-away lane; and
   a rotational system that is configured to rotate a diverted article in the direction of the take-away lane, said rotation system being a portion of said take-away lane;
   wherein said rotational system comprises another conveying surface having a first portion and a second portion, said first portion biasing articles toward said second portion, said second portion conveying articles in a direction of said take-away lane; and
   wherein said second portion has a surface with a higher friction than said first portion.

8. The positive displacement sorter as claimed in claim 4, wherein said second portion comprises a high-friction belt.

9. The positive displacement sorter as claimed in claim 4, wherein said second portion comprises of a plurality of high-friction parallel rollers.

10. The positive displacement sorter as claimed in claim 4, wherein said first and second portions comprise parallel rollers and wherein said parallel rollers of said first portion are not co-axial with respect to the parallel rollers of said second portion.

11. The positive displacement sorter as claimed in claim 10 including separate drive belt assemblies configured to drive the parallel rollers of said first portion and the parallel rollers of said second portion.

12. The positive displacement sorter as claimed in claim 4, wherein said first and second portions have a same conveying speed.

13. The positive displacement sorter as claimed in claim 1, further comprising a live roller conveyor curve downstream of said take-away lane, wherein said live roller conveyor curve having a plurality of rollers and a belt drive system configured to drive the rollers.

14. A positive displacement sorter, comprising:
   a conveying surface configured to convey articles in a longitudinal direction;
   at least one diagonal take-away lane, extending diagonally from said conveying surface to receive articles being diverted from said conveying surface;
   a plurality of pushers configured to move together in a lateral direction to displace an item on said conveying surface to said diagonal take-away lane;
   a rotational system that is configured to rotate a leading portion of a diverted article in the direction of the take-away lane; and
   a live roller conveyor curve downstream of said take-away lane, said live roller conveyor curve having a plurality of rollers and a belt drive system configured to drive the rollers;
   wherein said belt drive system comprises:
     a drive belt having a defined cross section configured to frictionally drive the plurality of rollers;
     a motor driven pulley driven by a motor and configured to drive said drive belt;
     a plurality of drive belt guide pulleys configured to guide said drive belt along an inner arc of a belt drive path;
     a plurality of support pressure assemblies configured to guide said drive belt along an outer arc of said belt drive path and maintain said drive belt in contact with the roller;

at least one take-up pulley configured to maintain tension on said drive belt; and a plurality of line end pulleys defining the ends of said belt drive path;

wherein said motor driven pulley, said drive belt guide pulleys, said support pressure assemblies, said take-up pulley, and said line end pulleys configured to drive and support said drive belt within said belt drive path; and wherein said belt drive path is oriented within a single drive plane such that the cross sectional orientation of said drive belt is maintained relative to said drive plane.

15. The positive displacement sorter as claimed in claim 14, wherein said drive plane is defined by a plane passing through said inner arc of said drive belt path and through said outer of arc of said drive belt path, wherein said drive plane is configured such that said outer arc of said drive belt path corresponds to the location of a bottom surface of the rollers and the inner arc of said drive belt path is below the rollers such that the inner arc of said drive belt path and the rollers do not intersect or conflict, wherein said drive belt is configured to frictionally engage the plurality of rollers of the live roller conveyor along the outer arc of said drive belt path to drive the rollers.

16. The positive displacement sorter as claimed in claim 14, wherein each of said plurality of support pressure assemblies comprises a pulley system, a support frame, a pin-type fastener, and a shock absorbing support, said support frame attached at one end to a frame of the live roller conveyor curve with said pin-type fastener and supported at the opposite end on the conveyor frame by said shock absorbing support, said pulley system configured to support said drive belt in contact with the rollers along said outer arc of said belt drive path.

17. The positive displacement sorter as claimed in claim 16, wherein said pulley system comprises a set of roller bearings disposed substantially perpendicular to each other and defining a cradle or guide for the drive belt, said roller bearings disposed on said support frame.

18. The positive displacement sorter as claimed in claim 16, wherein said pulley system comprises a v-belt pulley disposed on said support frame.

19. The positive displacement sorter as claimed in claim 13, further comprising a power take-off disposed within said belt drive system, wherein said power take-off is powered by a drive belt of said belt drive system when said belt drive system is in operation.

20. A method of diverting articles with a positive displacement sorter, said method comprising:

the positive displacement sorter having a conveying surface configured to convey articles in a longitudinal direction, at least one diagonal take-away lane, extending diagonally from said conveying surface to receive articles being diverted from said conveying surface; and a plurality of pushers configured to move together in a lateral direction to displace an item on said conveying surface to said diagonal take-away lane, wherein the item is displaced in a longitudinal orientation that is parallel to the longitudinal direction of the conveying surface; and rotating a leading portion of a diverted article in the direction of the take-away lane.

21. The method of diverting articles as claimed in claim 20, wherein said rotating a leading portion of a diverted article in the direction of the take-away lane includes a rotation system being a portion of the take-away lane configured to rotate the leading portion of the diverted article in the direction of the take-away lane.

* * * * *